United States Patent
Chen et al.

(10) Patent No.: US 10,656,384 B2
(45) Date of Patent: May 19, 2020

(54) WIDE-ANGLE LENS ASSEMBLY

(71) Applicants: Sintai Optical (Shenzhen) Co., Ltd., ShenZhen, Guandong Province (CN); Asia Optical Co., Inc., Taichung (TW)

(72) Inventors: Chien-Hung Chen, Taichung (TW); Hsi-Ling Chang, Taichung (TW); Yuan-Fan Liang, Taichung (TW)

(73) Assignees: SINTAI OPTICAL (SHENZHEN) CO., LTD., Shenzhen, Guandong Province (CN); ASIA OPTICAL CO., INC., Taichung (TW)

( * ) Notice: Subject to any disclaimer, the term of this patent is extended or adjusted under 35 U.S.C. 154(b) by 123 days.

(21) Appl. No.: 15/869,315

(22) Filed: Jan. 12, 2018

(65) Prior Publication Data

US 2018/0335611 A1 Nov. 22, 2018

(30) Foreign Application Priority Data

May 18, 2017 (CN) .......................... 2017 1 0350671

(51) Int. Cl.
| | |
|---|---|
| G02B 3/02 | (2006.01) |
| G02B 13/18 | (2006.01) |
| G02B 13/00 | (2006.01) |
| G02B 9/62 | (2006.01) |
| G02B 13/06 | (2006.01) |

(52) U.S. Cl.
CPC .......... G02B 13/0045 (2013.01); G02B 9/62 (2013.01); G02B 13/06 (2013.01)

(58) Field of Classification Search
CPC ...... G02B 13/0045; G02B 13/18; G02B 9/62; G02B 27/0025; G02B 3/04

USPC .......................................................... 359/713
See application file for complete search history.

(56) References Cited

U.S. PATENT DOCUMENTS

| | | | |
|---|---|---|---|
| 9,791,670 B2 | 10/2017 | Lin et al. | |
| 10,222,589 B1* | 3/2019 | Oinuma | G02B 13/0045 |
| 10,274,701 B1* | 4/2019 | Fang | G02B 13/0045 |
| 2012/0069140 A1* | 3/2012 | Tsai | G02B 13/0045 |
| | | | 348/36 |

(Continued)

FOREIGN PATENT DOCUMENTS

| | | |
|---|---|---|
| CN | 105204144 A | 12/2015 |
| CN | 106125258 A | 11/2016 |

(Continued)

Primary Examiner — William R Alexander
Assistant Examiner — Tamara Y. Washington
(74) Attorney, Agent, or Firm — McClure, Qualey & Rodack, LLP.

(57) ABSTRACT

A wide-angle lens assembly includes a first lens, a second lens, a third lens, a fourth lens, a fifth lens, and a sixth lens. The first lens is with refractive power. The second lens includes a convex surface facing the object side. The third lens is with positive refractive power and includes a convex surface facing the image side. The fourth lens is with refractive power. The fifth lens includes a concave surface facing the object side. The sixth lens includes a concave surface facing the image side. The wide-angle lens assembly satisfies: $0.62 < (R_{41} - R_{42})/(R_{41} + R_{42}) < 5.60$, wherein $R_{41}$ is a radius of curvature of an object side surface of the fourth lens and $R_{42}$ is a radius of curvature of an image side surface of the fourth lens.

20 Claims, 18 Drawing Sheets

(56) References Cited

U.S. PATENT DOCUMENTS

| | | | | |
|---|---|---|---|---|
| 2012/0188654 A1* | 7/2012 | Huang | | G02B 9/62 359/713 |
| 2012/0212836 A1* | 8/2012 | Hsieh | | G02B 13/0045 359/708 |
| 2012/0243108 A1* | 9/2012 | Tsai | | G02B 13/0045 359/713 |
| 2013/0070346 A1* | 3/2013 | Hsu | | G02B 9/62 359/713 |
| 2013/0235473 A1* | 9/2013 | Chen | | G02B 13/0045 359/713 |
| 2013/0279021 A1* | 10/2013 | Chen | | G02B 13/0045 359/713 |
| 2014/0118844 A1* | 5/2014 | Tsai | | G02B 9/62 359/713 |
| 2015/0054994 A1* | 2/2015 | Tsai | | G02B 3/04 348/294 |
| 2015/0253547 A1* | 9/2015 | Sun | | G02B 13/0045 359/713 |
| 2015/0362703 A1* | 12/2015 | Park | | G02B 13/0045 359/713 |
| 2016/0282585 A1* | 9/2016 | Shih | | G02B 13/0045 |
| 2016/0341933 A1 | 11/2016 | Liu et al. | | |
| 2017/0023774 A1* | 1/2017 | Huang | | G02B 3/04 |
| 2018/0045914 A1* | 2/2018 | Park | | G02B 13/0045 |
| 2018/0329177 A1* | 11/2018 | Chen | | G02B 13/0045 |
| 2018/0335611 A1* | 11/2018 | Chen | | G02B 9/62 |
| 2019/0121067 A1* | 4/2019 | Oinuma | | G02B 13/0045 |
| 2019/0121068 A1* | 4/2019 | Oinuma | | G02B 13/0045 |
| 2019/0146190 A1* | 5/2019 | Chen | | G02B 13/06 |
| 2019/0219798 A1* | 7/2019 | Shih | | G02B 13/0045 |
| 2019/0227286 A1* | 7/2019 | Chen | | G02B 9/62 |
| 2019/0285861 A1* | 9/2019 | Chen | | G02B 9/62 |

FOREIGN PATENT DOCUMENTS

| | | |
|---|---|---|
| TW | M357610 U | 5/2009 |
| TW | 201636670 A | 10/2016 |

* cited by examiner

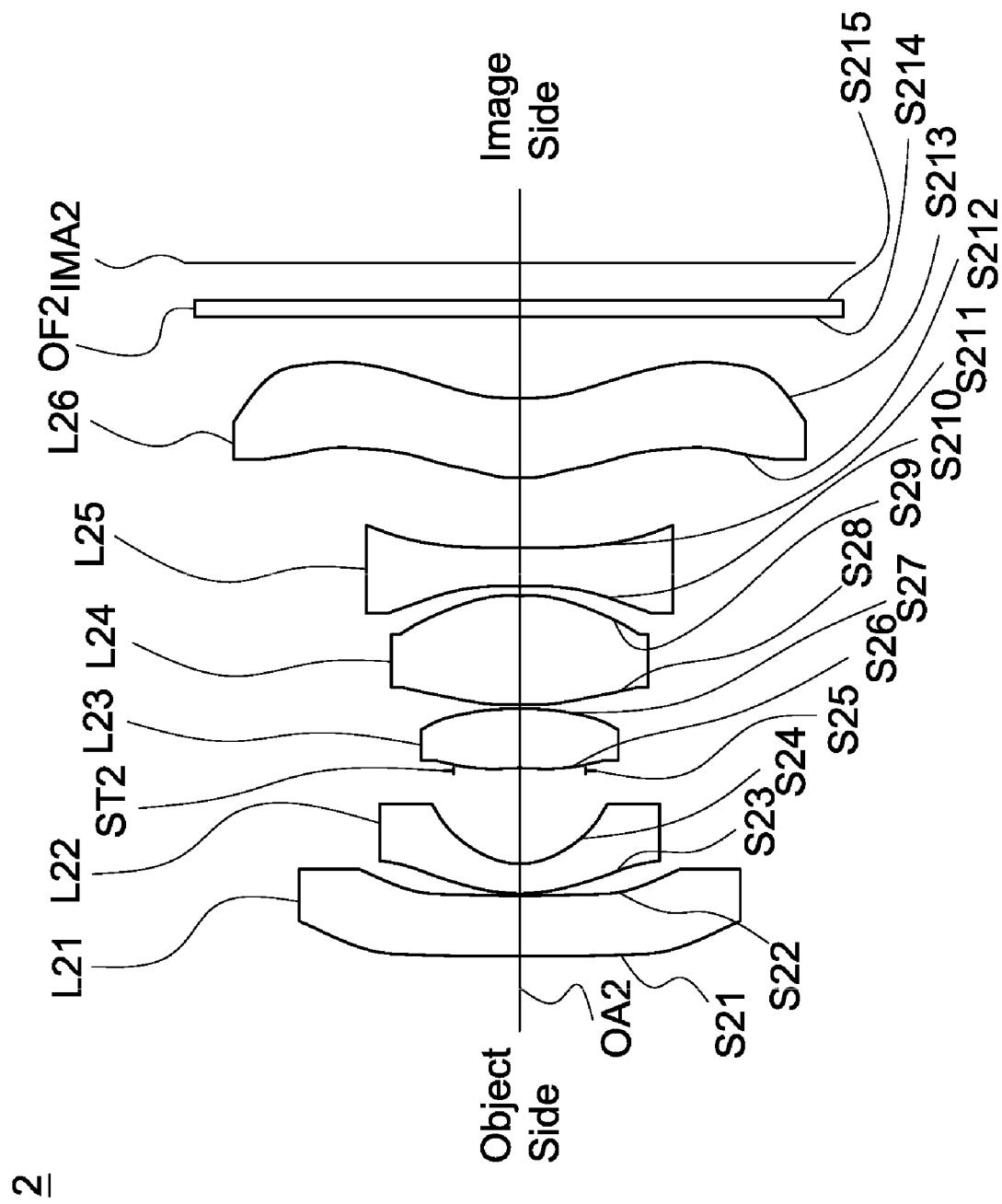

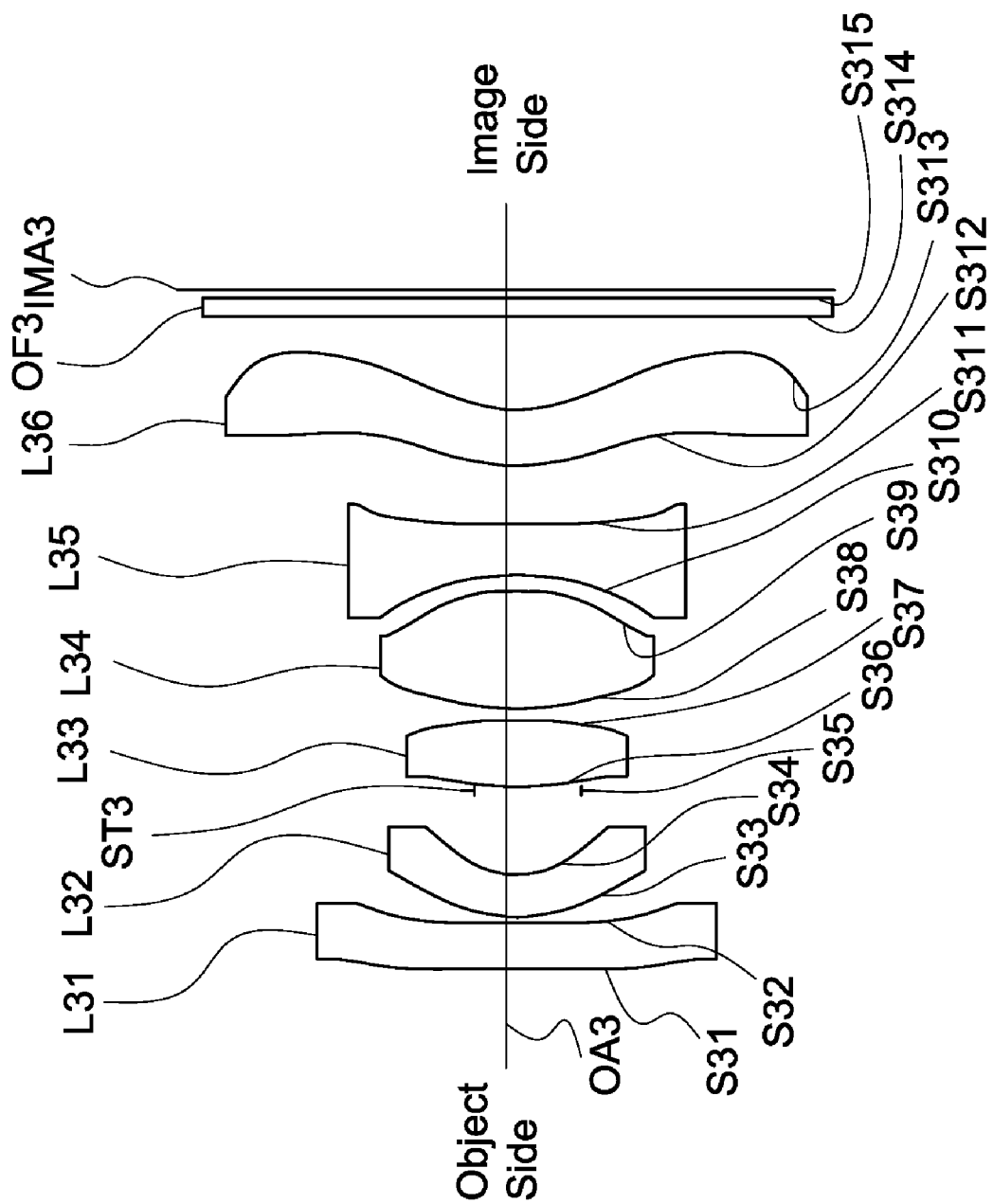

WIDE-ANGLE LENS ASSEMBLY

BACKGROUND OF THE INVENTION

Field of the Invention

The invention relates to a wide-angle lens assembly.

Description of the Related Art

The current development trend of a wide-angle lens assembly is toward large field of view. Additionally, the wide-angle lens assembly is developed to have miniaturization and high-resolution capability in accordance with different application requirements. However, the known wide-angle lens assembly cannot satisfy such requirements. Therefore, the wide-angle lens assembly needs a new structure in order to meet the requirements of large field of view, miniaturization, and high resolution at the same time.

BRIEF SUMMARY OF THE INVENTION

The invention provides a wide-angle lens assembly to solve the above problems. The wide-angle lens assembly of the invention is provided with characteristics of a larger field of view, a shortened total lens length, a higher resolution, and still has a good optical performance.

The wide-angle lens assembly in accordance with an exemplary embodiment of the invention includes a first lens, a second lens, a third lens, a fourth lens, a fifth lens, and a sixth lens, wherein the first lens, the second lens, the third lens, the fourth lens, the fifth lens, and the sixth lens are arranged in order from an object side to an image side along an optical axis. The first lens is with refractive power. The second lens includes a convex surface facing the object side. The third lens is with positive refractive power and includes a convex surface facing the image side. The fourth lens is with refractive power. The fifth lens includes a concave surface facing the object side. The sixth lens includes a concave surface facing the image side. The wide-angle lens assembly satisfies: $0.61<(R_{41}-R_{42})/(R_{41}+R_{42})<5.60$, wherein $R_{41}$ is a radius of curvature of an object side surface of the fourth lens and $R_{42}$ is a radius of curvature of an image side surface of the fourth lens.

In another exemplary embodiment, the second lens further includes a concave surface facing the image side, the third lens further includes a convex surface facing the object side, and the fourth lens includes a convex surface facing the object side.

In yet another exemplary embodiment, the wide-angle lens assembly further includes a stop disposed between the second lens and the third lens.

In another exemplary embodiment, the wide-angle lens assembly satisfies: $0.5<SL/TTL<0.8$, wherein SL is an interval from the stop to an image plane along the optical axis and TTL is an interval from an object side surface of the first lens to the image plane along the optical axis.

In yet another exemplary embodiment, the wide-angle lens assembly satisfies: $1.54|f_6/f|\le13.37$, wherein $f_6$ is an effective focal length of the sixth lens and f is an effective focal length of the wide-angle lens assembly.

In another exemplary embodiment, the wide-angle lens assembly satisfies: $1.00\le(Nd_1\times Vd_1)/(Nd_3\times Vd_3)<1.29$, wherein $Nd_1$ is an index of refraction of the first lens, $Nd_3$ is an index of refraction of the third lens, $Vd_1$ is an Abbe number of the first lens, and $Vd_3$ is an Abbe number of the third lens.

In yet another exemplary embodiment, the wide-angle lens assembly satisfies: $0\le|Vd_1-Vd_2|<36$, wherein $Vd_1$ is an Abbe number of the first lens and $Vd_2$ is an Abbe number of the second lens.

In another exemplary embodiment, the wide-angle lens assembly satisfies: $0.6<(Vd_1+Vd_2)/Vd_6<5.5$, wherein $Vd_1$ is an Abbe number of the first lens, $Vd_2$ is an Abbe number of the second lens, and $Vd_6$ is an Abbe number of the sixth lens.

In yet another exemplary embodiment, the first lens includes two surfaces, at least one of which is an aspheric surface or both of which are aspheric surfaces, the convex surface of the second lens is an aspheric surface, or the concave surface of the second lens is an aspheric surface, or both of the convex surface and the concave surface of the second lens are aspheric surfaces, at least one of the two convex surfaces of the third lens is an aspheric surface or both of the two convex surfaces of the third lens are aspheric surfaces, the fourth lens further includes a surface, wherein the surface is an aspheric surface, or the convex surface of the fourth lens is an aspheric surface, or both of the surface and the convex surface of the fourth lens are aspheric surfaces, the fifth lens further includes a surface, wherein the surface is an aspheric surface, or the concave surface of the fifth lens is an aspheric surface, or both of the surface and the concave surface of the fifth lens are aspheric surfaces, and the sixth lens further includes a surface, wherein the surface is an aspheric surface, or the concave surface of the sixth lens is an aspheric surface, or both of the surface and the concave surface of the sixth lens are aspheric surfaces.

In another exemplary embodiment, the first lens, the second lens, the third lens, the fourth lens, the fifth lens, and the sixth lens are made of plastic material.

The wide-angle lens assembly in accordance with an exemplary embodiment of the invention includes a first lens, a second lens, a third lens, a stop, a fourth lens, a fifth lens, and a sixth lens, wherein the first lens, the second lens, the third lens, the stop, the fourth lens, the fifth lens, and the sixth lens are arranged in order from an object side to an image side along an optical axis. The first lens is with refractive power. The second lens is with negative refractive power. The third lens is with positive refractive power and includes a convex surface facing the image side. The fourth lens is with refractive power. The fifth lens is with refractive power and includes a concave surface facing the object side. The sixth lens is with positive refractive.

In another exemplary embodiment, the first lens is with negative refractive power, the fourth lens is with positive refractive power, and the fifth lens is with negative refractive power.

In yet another exemplary embodiment, the first lens includes a convex surface facing the object side, the second lens includes a concave surface facing the image side, the third lens further includes a convex surface facing the object side, the fourth lens includes a convex surface facing the image side, the fifth lens further includes a concave surface facing the image side, and the sixth lens includes a convex surface facing the image side.

In another exemplary embodiment, the wide-angle lens assembly satisfies: $0.61<(R_{41}-R_{42})/(R_{41}+R_{42})<5.60$, wherein $R_{41}$ is a radius of curvature of an object side surface of the fourth lens and $R_{42}$ is a radius of curvature of the convex surface of the fourth lens.

In yet another exemplary embodiment, the second lens includes a concave surface facing the image side.

In another exemplary embodiment, the wide-angle lens assembly satisfies: $0.4<SL/TTL<0.8$, wherein SL is an interval from the stop to an image plane along the optical axis and TTL is an interval from an object side surface of the first lens to the image plane along the optical axis.

In yet another exemplary embodiment, the wide-angle lens assembly satisfies: $0 \leq |Vd_1-Vd_2| < 36$, wherein $Vd_1$ is an Abbe number of the first lens and $Vd_2$ is an Abbe number of the second lens.

In another exemplary embodiment, the wide-angle lens assembly satisfies: $0.6 < (Vd_1+Vd_2)/Vd_6 < 5.5$, wherein $Vd_1$ is an Abbe number of the first lens, $Vd_2$ is an Abbe number of the second lens, and $Vd_6$ is an Abbe number of the sixth lens.

In yet another exemplary embodiment, the wide-angle lens assembly satisfies: $0.65 < |f_{456}/f_{123}| < 1.95$, wherein $f_{123}$ is an effective focal length of a combination of the first lens, the second lens, and the third lens and $f_{456}$ is an effective focal length of a combination of the fourth lens, the fifth lens, and the sixth lens.

In another exemplary embodiment, the wide-angle lens assembly satisfies: $4.4 < TTL/EPP < 6.2$, wherein TTL is an interval from an object side surface of the first lens to an image plane along the optical axis and EPP is an entrance pupil position.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 3 is a lens layout diagram of a wide-angle lens assembly in accordance with a second embodiment of the invention;

FIG. 5 is a lens layout diagram of a wide-angle lens assembly in accordance with a third embodiment of the invention;

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
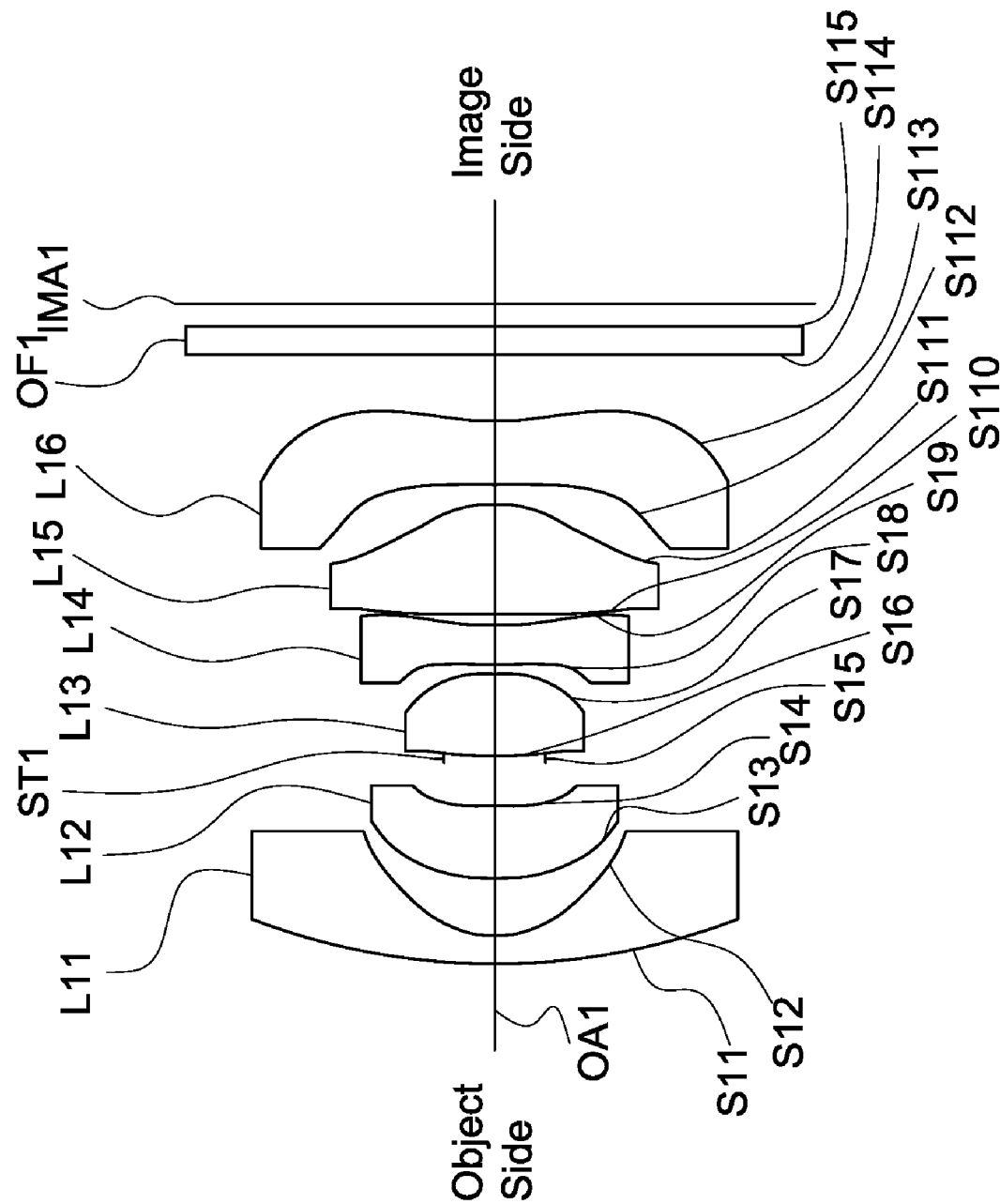
FIG. 1 is a lens layout diagram of a wide-angle lens assembly in accordance with a first embodiment of the invention.

Referring to FIG. 1, FIG. 1 is a lens layout diagram of a wide-angle lens assembly in accordance with a first embodiment of the invention. The wide-angle lens assembly 1 includes a first lens L11, a second lens L12, a stop ST1, a third lens L13, a fourth lens L14, a fifth lens L15, a sixth lens L16, and an optical filter OF1, all of which are arranged in order from an object side to an image side along an optical axis OA1. In operation, an image of light rays from the object side is formed at an image plane IMA1.

The first lens L11 is a meniscus lens with negative refractive power and made of plastic material, wherein the object side surface S11 is a convex surface, the image side surface S12 is a concave surface, and both of the object side surface S11 and image side surface S12 are aspheric surfaces.

The second lens L12 is a meniscus lens with positive refractive power and made of plastic material, wherein the object side surface S13 is a convex surface, the image side surface S14 is a concave surface, and both of the object side surface S13 and image side surface S14 are aspheric surfaces.

The third lens L13 is a biconvex lens with positive refractive power and made of plastic material, wherein the object side surface S16 is a convex surface, the image side surface S17 is a convex surface, and both of the object side surface S16 and image side surface S17 are aspheric surfaces.

The fourth lens L14 is a meniscus lens with negative refractive power and made of plastic material, wherein the object side surface S18 is a convex surface, the image side surface S19 is a concave surface, and both of the object side surface S18 and image side surface S19 are aspheric surfaces.

The fifth lens L15 is a meniscus lens with positive refractive power and made of plastic material, wherein the object side surface S110 is a concave surface, the image side surface S111 is a convex surface, and both of the object side surface S110 and image side surface S111 are aspheric surfaces.

The sixth lens L16 is a biconcave lens with negative refractive power and made of plastic material, wherein the object side surface S112 is a concave surface, the image side surface S113 is a concave surface, and both of the object side surface S112 and image side surface S113 are aspheric surfaces.

Both of the object side surface S114 and image side surface S115 of the optical filter OF1 are plane surfaces.

In order to maintain excellent optical performance of the wide-angle lens assembly in accordance with the first embodiment of the invention, the wide-angle lens assembly 1 satisfies at least one of the following conditions:

$$0.61 < (R1_{41} - R1_{42})/(R1_{41} + R1_{42}) < 5.60 \quad (1)$$

$$0.4 < SL1/TTL1 < 0.8 \quad (2)$$

$$1.54 \le |f1_6/f1| \le 13.37 \quad (3)$$

$$1.00 \le (Nd1_1 \times Vd1_1)/(Nd1_3 \times Vd1_3) < 1.29 \quad (4)$$

$$0 \le |Vd1_1 - Vd1_2| < 36 \quad (5)$$

$$0.6 < (Vd1_1 + Vd1_2)/Vd1_6 < 5.5 \quad (6)$$

wherein $R1_{41}$ is a radius of curvature of the object side surface S18 of the fourth lens L14, $R1_{42}$ is a radius of curvature of the image side surface S19 of the fourth lens L14, SL1 is an interval from the stop ST1 to the image plane IMA1 along the optical axis OA1, TTL1 is an interval from the object side surface S11 of the first lens L11 to the image plane IMA1 along the optical axis OA1, $f1_6$ is an effective focal length of the sixth lens L16, f1 is an effective focal length of the wide-angle lens assembly 1, $Nd1_1$ is an index of refraction of the first lens L11, $Nd1_3$ is an index of refraction of the third lens L13, $Vd1_1$ is an Abbe number of the first lens L11, $Vd1_2$ is an Abbe number of the second lens L12, $Vd1_3$ is an Abbe number of the third lens L13, and $Vd1_6$ is an Abbe number of the sixth lens L16.

By the above design of the lenses, stop ST1, and satisfies at least one of the conditions (1)-(6), the wide-angle lens assembly 1 is provided with an effective shortened total lens length, an effective decreased F-number, an effective increased field of view, an effective increased resolution, and an effective corrected aberration.

In order to achieve the above purposes and effectively enhance the optical performance, the wide-angle lens assembly 1 in accordance with the first embodiment of the invention is provided with the optical specifications shown in Table 1, which include the effective focal length, F-number, total lens length, field of view, radius of curvature of each lens surface, thickness between adjacent surface, refractive index of each lens, and Abbe number of each lens. Table 1 shows that the effective focal length is equal to 1.2058 mm, F-number is equal to 2.4, total lens length is equal to 4.95 mm, and field of view is equal to 143 degrees for the wide-angle lens assembly 1 of the first embodiment of the invention.

TABLE 1

Effective Focal Length = 1.2058 mm
F-number = 2.4
Total Lens Length = 4.95 mm
Field of View = 143 Degrees

| Surface Number | Radius of Curvature (mm) | Thickness (mm) | Nd | Vd | Remark |
|---|---|---|---|---|---|
| S11 | 5.408051 | 0.204027 | 1.543915 | 55.9512 | The First Lens L11 |
| S12 | 0.710163 | 0.438154 | | | |
| S13 | 1.544388 | 0.53731 | 1.650958 | 21.51361 | The Second Lens L12 |
| S14 | 2.810599 | 0.362879 | | | |
| S15 | ∞ | 0.010997 | | | Stop ST1 |
| S16 | 2.416652 | 0.629225 | 1.543915 | 55.9512 | The Third Lens L13 |
| S17 | −1.09284 | 0.060965 | | | |
| S18 | 8.24124 | 0.290111 | 1.650958 | 21.51361 | The Fourth Lens L14 |
| S19 | 1.945135 | 0.087749 | | | |
| S110 | −24.3364 | 0.829364 | 1.543915 | 55.9512 | The Fifth Lens L15 |
| S111 | −0.76137 | 0.141868 | | | |
| S112 | −34.9881 | 0.474574 | 1.650958 | 21.51361 | The Sixth Lens L16 |
| S113 | 1.60796 | 0.5 | | | |
| S114 | ∞ | 0.21 | 1.543915 | 55.9512 | Optical Filter OF1 |
| S115 | ∞ | 0.179825 | | | |

The aspheric surface sag z of each lens in table 1 can be calculated by the following formula:

$$z = ch^2/\{1 + [1-(k+1)c^2h^2]^{1/2}\} + Ah^4 \pm Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the first embodiment, the conic constant k and the aspheric coefficients A, B, C, D, E, F, G of each surface are shown in Table 2.

TABLE 2

| Surface Number | k | A | B | C |
|---|---|---|---|---|
| S11 | −2.34774 | 0.002186692 | −0.000215788 | 1.84722E−05 |
| S12 | −0.79128 | −0.13002673 | 0.080619278 | 0.10136552 |
| S13 | −9.91973 | 0.23782745 | 0.11418644 | −0.009807514 |
| S14 | 0 | 0.26823292 | 0.89470711 | −0.39193677 |
| S16 | 6.396332 | 0.020258342 | −0.65952213 | 0.86477946 |
| S17 | −2.46911 | −0.35277444 | −0.15488445 | −0.030007962 |
| S18 | −2231.84 | −0.34073773 | −0.095700548 | −0.029240353 |
| S19 | −29.0312 | −0.056700552 | 0.015252993 | −0.003226936 |
| S110 | −2413.95 | 0.045283244 | 0.031150008 | −0.00159364 |
| S111 | −2.7594 | 0.00286144 | 0.040090398 | 0.010727947 |
| S112 | 671.7513 | −0.10604476 | −0.038213532 | −0.003276 |
| S113 | −21.2372 | −0.10290978 | 0.021559284 | −0.006331901 |

| Surface Number | D | E | F | G |
|---|---|---|---|---|
| S11 | 6.23829E−05 | 2.09843E−05 | −4.26767E−06 | −1.12087E−06 |
| S12 | 0.064069461 | −0.041124462 | −0.072014883 | 0.017228151 |
| S13 | 0.092220313 | 0.066692032 | −0.13467147 | −0.014315083 |

TABLE 2-continued

| | | | | |
|---|---|---|---|---|
| S14 | −0.006261132 | −2.9997374 | 12.047202 | 4.7851641 |
| S16 | −2.0325251 | −27.180939 | 158.73356 | −263.51828 |
| S17 | −1.4098971 | −2.9506773 | 1.9438287 | −2.9840105 |
| S18 | −0.43013216 | −0.96690184 | −1.7140905 | −2.5689272 |
| S19 | 0.005234317 | 0.002913036 | −0.007360986 | −0.0147535 |
| S110 | −0.008961035 | −0.006872562 | −2.46E-03 | −0.002172445 |
| S111 | −0.000185942 | −1.81E-03 | −2.74E-03 | 0.000477437 |
| S112 | 0.001773984 | 0.000741744 | 7.93E-04 | 1.34E-04 |
| S113 | −5.99559E-05 | 2.01E-04 | 6.67E-05 | −2.58E-05 |

Table 3 shows the parameters and condition values for conditions (1)-(6). As can be seen from Table 3, the wide-angle lens assembly 1 of the first embodiment satisfies the conditions (1)-(6).

TABLE 3

| | | | | | |
|---|---|---|---|---|---|
| $R1_{41}$ | 8.24124 mm | $R1_{42}$ | 1.945135 mm | SL1 | 3.41 mm |
| TTL1 | 4.95 mm | $fl_6$ | −2.32422 mm | f1 | 1.2058 mm |
| $Nd1_1$ | 1.543915 | $Vd1_1$ | 55.9512 | $Nd1_3$ | 1.543915 |
| $Vd1_3$ | 55.9512 | $Vd1_2$ | 21.51361 | $Vd1_6$ | 21.51361 |
| $(R1_{41} - R1_{42})/(R1_{41} + R1_{42})$ | 0.618 | SL1/TTL1 | 0.69 | $|fl_6/f1|$ | 1.93 |
| $(Nd1_1 \times Vd1_1)/(Nd1_3 \times Vd1_3)$ | 1 | $|Vd1_1 - Vd1_2|$ | 34.44 | | |
| $(Vd1_1 + Vd1_2)/Vd1_6$ | 3.60 | | | | |

Figure 2A:
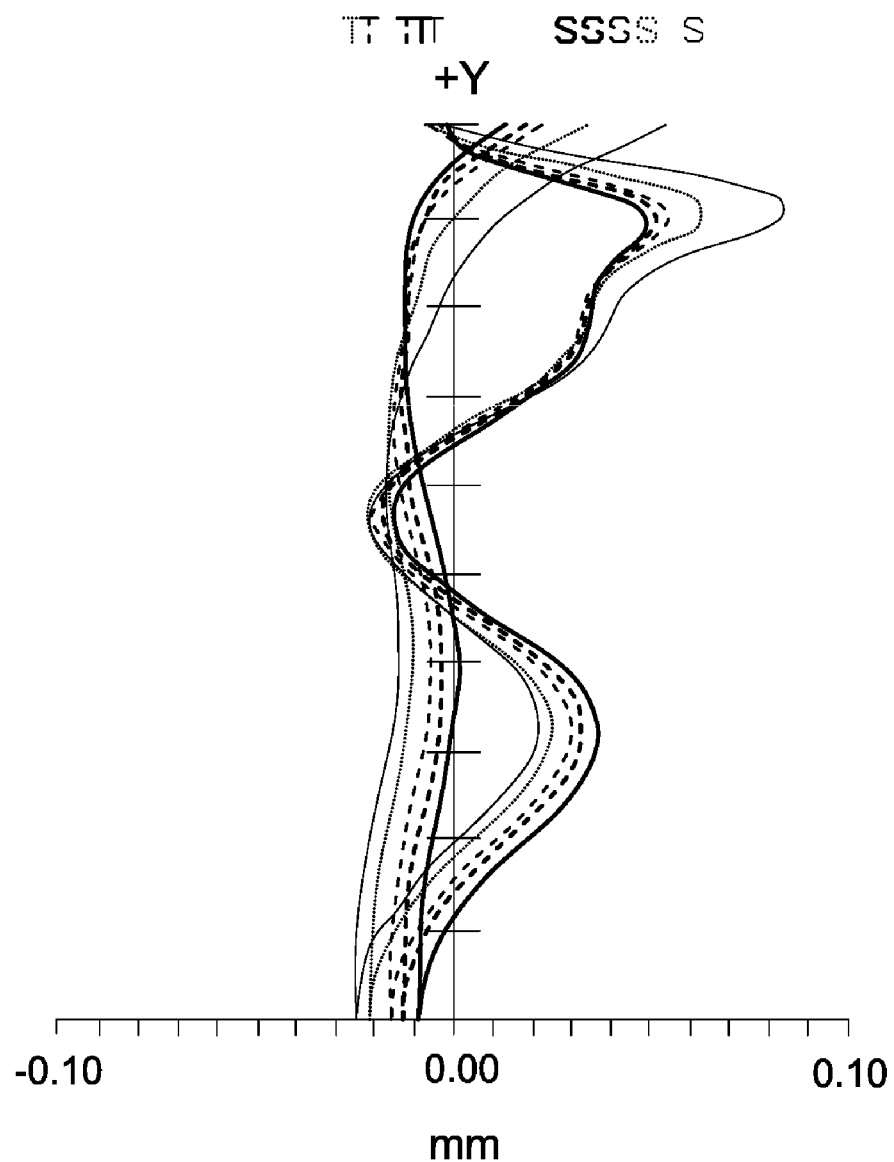
FIG. 2A depicts a field curvature diagram of the wide-angle lens assembly in accordance with the first embodiment of the invention.
Figure 2B:
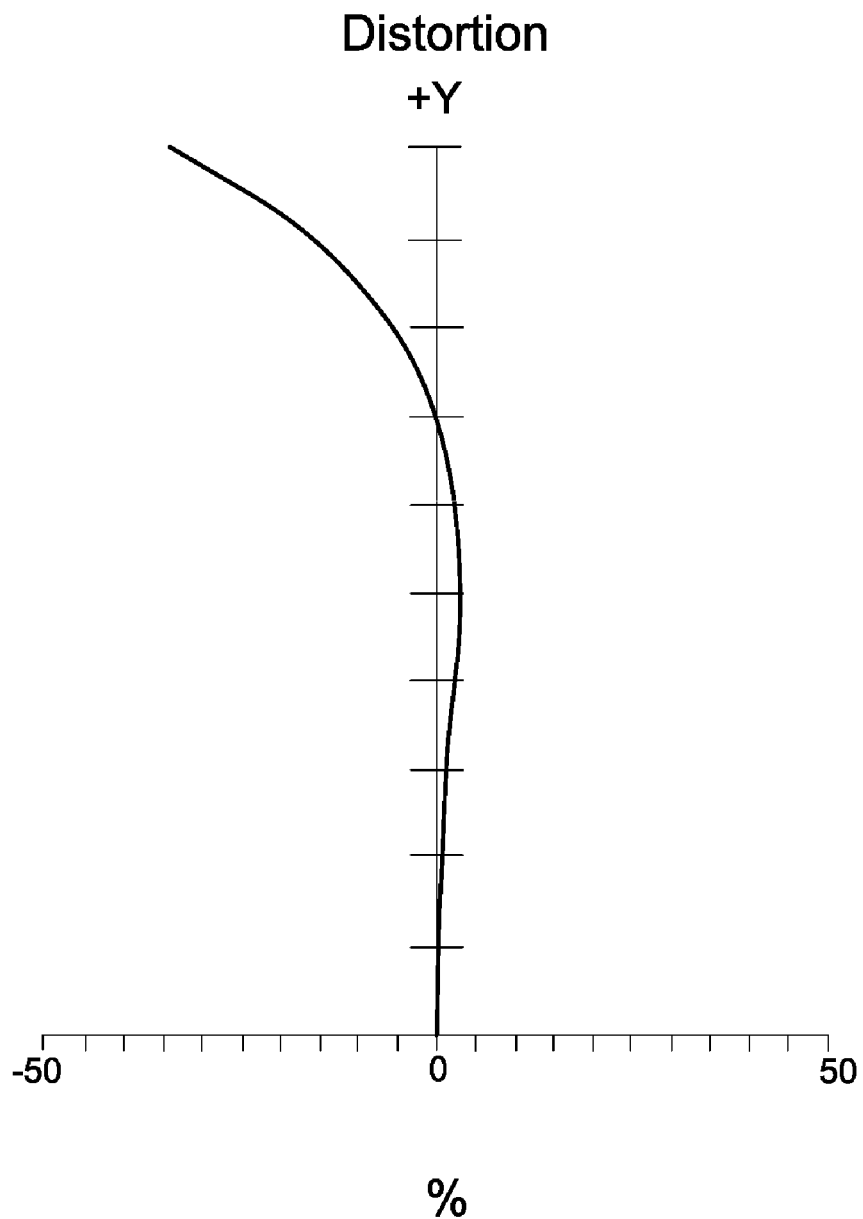
FIG. 2B is a distortion diagram of the wide-angle lens assembly in accordance with the first embodiment of the invention.
Figure 2C:
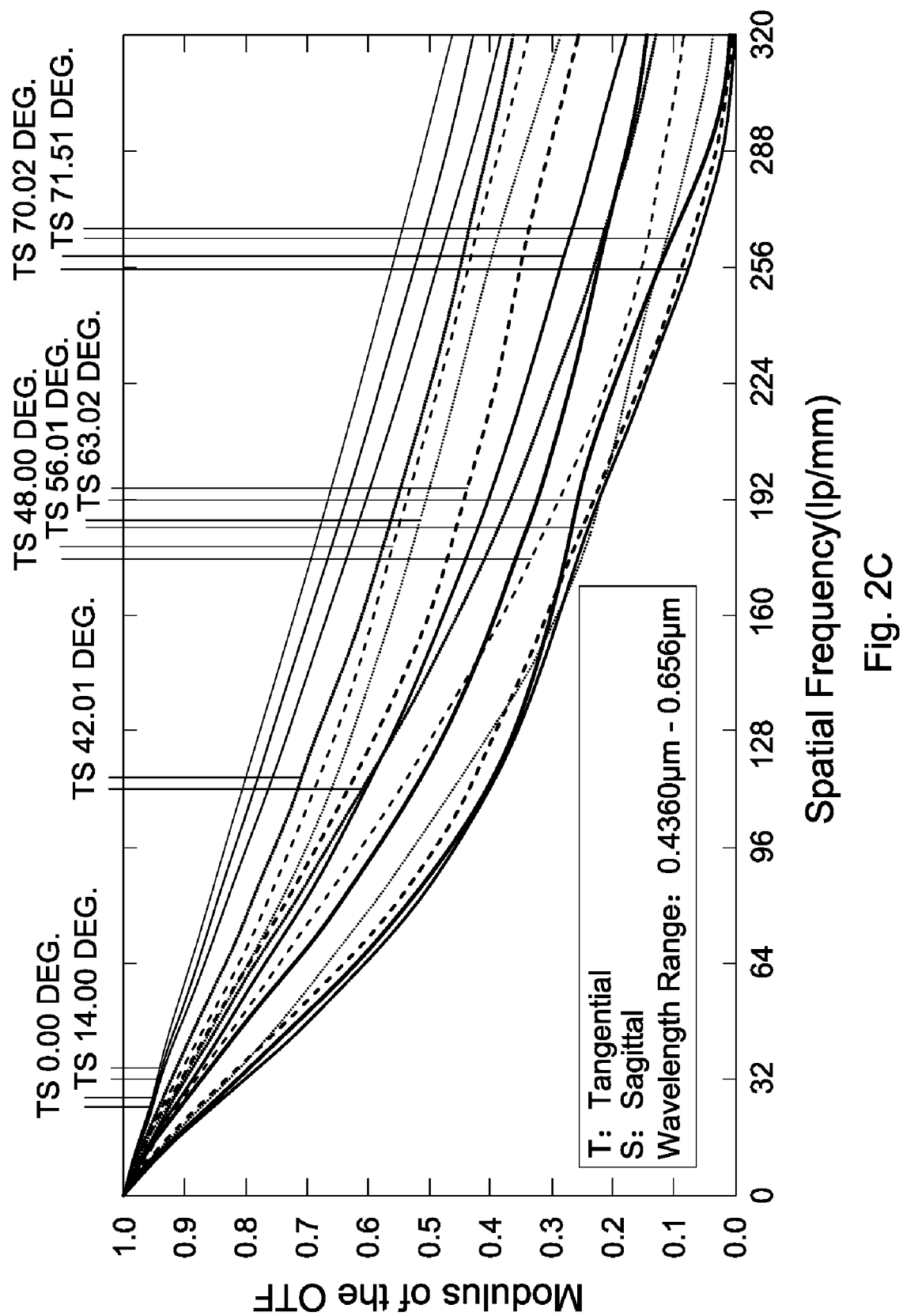
FIG. 2C is a modulation transfer function diagram of the wide-angle lens assembly in accordance with the first embodiment of the invention.

By the above arrangements of the lenses and stop ST1, the wide-angle lens assembly 1 of the first embodiment can meet the requirements of optical performance as seen in FIGS. 2A-2C, wherein FIG. 2A shows a field curvature diagram of the wide-angle lens assembly 1 in accordance with the first embodiment of the invention, FIG. 2B shows a distortion diagram of the wide-angle lens assembly 1 in accordance with the first embodiment of the invention, and FIG. 2C shows a modulation transfer function diagram of the wide-angle lens assembly 1 in accordance with the first embodiment of the invention.

It can be seen from FIG. 2A that the field curvature of tangential direction and sagittal direction in the wide-angle lens assembly 1 of the first embodiment ranges from −0.03 mm to 0.09 mm for the wavelength of 0.436 μm, 0.486 μm, 0.546 μm, 0.588 μm, and 0.656 μm.

It can be seen from FIG. 2B (in which the five lines in the figure almost coincide to appear as if a signal line) that the distortion in the wide-angle lens assembly 1 of the first embodiment ranges from −35% to 0% for the wavelength of 0.436 μm, 0.486 μm, 0.546 μm, 0.588 μm, and 0.656 μm.

It can be seen from FIG. 2C that the modulation transfer function of tangential direction and sagittal direction in the wide-angle lens assembly 1 of the first embodiment ranges from 0.0 to 1.0 wherein the wavelength ranges from 0.436 μm to 0.656 μm, the fields respectively are 0.00 degree, 14.00 degrees, 42.01 degrees, 48.00 degrees, 56.01 degrees, 63.02 degrees, 70.02 degrees, and 71.51 degrees, and the spatial frequency ranges from 0 lp/mm to 320 lp/mm.

It is obvious that the field curvature and the distortion of the wide-angle lens assembly 1 of the first embodiment can be corrected effectively, and the resolution of the wide-angle lens assembly 1 of the first embodiment can meet the requirement. Therefore, the wide-angle lens assembly 1 of the first embodiment is capable of good optical performance.

Referring to FIG. 3, FIG. 3 is a lens layout diagram of a wide-angle lens assembly in accordance with a second embodiment of the invention. The wide-angle lens assembly 2 includes a first lens L21, a second lens L22, a stop ST2, a third lens L23, a fourth lens L24, a fifth lens L25, a sixth lens L26, and an optical filter OF2, all of which are arranged in order from an object side to an image side along an optical axis OA2. In operation, an image of light rays from the object side is formed at an image plane IMA2.

The first lens L21 is a meniscus lens with negative refractive power and made of plastic material, wherein the object side surface S21 is a concave surface, the image side surface S22 is a convex surface, and both of the object side surface S21 and image side surface S22 are aspheric surfaces.

The second lens L22 is a meniscus lens with negative refractive power and made of plastic material, wherein the object side surface S23 is a convex surface, the image side surface S24 is a concave surface, and both of the object side surface S23 and image side surface S24 are aspheric surfaces.

The third lens L23 is a biconvex lens with positive refractive power and made of plastic material, wherein the object side surface S26 is a convex surface, the image side surface S27 is a convex surface, and both of the object side surface S26 and image side surface S27 are aspheric surfaces.

The fourth lens L24 is a biconvex lens with positive refractive power and made of plastic material, wherein the object side surface S28 is a convex surface, the image side surface S29 is a convex surface, and both of the object side surface S28 and image side surface S29 are aspheric surfaces.

The fifth lens L25 is a biconcave lens with negative refractive power and made of plastic material, wherein the object side surface S210 is a concave surface, the image side surface S211 is a concave surface, and both of the object side surface S210 and image side surface S211 are aspheric surfaces.

The sixth lens L26 is a meniscus lens with positive refractive power and made of plastic material, wherein the object side surface S212 is a convex surface, the image side surface S213 is a concave surface, and both of the object side surface S212 and image side surface S213 are aspheric surfaces.

Both of the object side surface S214 and image side surface S215 of the optical filter OF2 are plane surfaces.

In order to maintain excellent optical performance of the wide-angle lens assembly in accordance with the second embodiment of the invention, the wide-angle lens assembly 2 satisfies at least one of the following conditions:

$$0.61 < (R2_{41} - R2_{42})/(R2_{41} + R2_{42}) < 5.60 \qquad (7)$$

$$0.4 < SL2/TTL2 < 0.8 \qquad (8)$$

$$1.54 \leq |f2_6/f2| \leq 13.37 \qquad (9)$$

$$1.00 \leq (Nd2_1 \times Vd2_1)/(Nd2_3 \times Vd2_3) < 1.29 \qquad (10)$$

$$0 \leq |Vd2_1 - Vd2_2| < 36 \qquad (11)$$

$$0.6 < (Vd2_1 + Vd2_2)/Vd2_6 < 5.5 \qquad (12)$$

The definition of $R2_{41}$, $R2_{42}$, SL2, TTL2, $f2_6$, f2, $Nd2_1$, $Nd2_3$, $Vd2_1$, $Vd2_2$, $Vd2_3$, and $Vd2_6$ are the same as that of $R1_{41}$, $R1_{42}$, SL1, TTL1, $f1_6$, f1, $Nd1_1$, $Nd1_3$, $Vd1_1$, $Vd1_2$, $Vd1_3$, and $Vd1_6$ in the first embodiment, and is not described here again.

By the above design of the lenses, stop ST2, and satisfies at least one of the conditions (7)-(12), the wide-angle lens assembly 2 is provided with an effective shortened total lens length, an effective decreased F-number, an effective increased field of view, an effective increased resolution, and an effective corrected aberration.

In order to achieve the above purposes and effectively enhance the optical performance, the wide-angle lens assembly 2 in accordance with the second embodiment of the invention is provided with the optical specifications shown in Table 4, which include the effective focal length, F-number, total lens length, field of view, radius of curvature of each lens surface, thickness between adjacent surface, refractive index of each lens, and Abbe number of each lens. Table 4 shows that the effective focal length is equal to 1.77306 mm, F-number is equal to 2.4, total lens length is equal to 4.95 mm, and field of view is equal to 147 degrees for the wide-angle lens assembly 2 of the second embodiment of the invention.

TABLE 4

Effective Focal Length = 1.77306 mm F-number = 2.4
Total Lens Length = 4.95 mm Field of View = 147 Degrees

| Surface Number | Radius of Curvature (mm) | Thickness (mm) | Nd | Vd | Remark |
|---|---|---|---|---|---|
| S21 | −11.6722 | 0.430572 | 1.543915 | 55.9512 | The First Lens L21 |
| S22 | −19.5842 | 0.006135 | | | |
| S23 | 1.101204 | 0.222995 | 1.543915 | 55.9512 | The Second Lens L12 |
| S24 | 0.522572 | 0.661713 | | | |
| S25 | ∞ | 0.0142 | | | Stop ST2 |
| S26 | 3.486144 | 0.427347 | 1.543915 | 55.9512 | The Third Lens L23 |
| S27 | −2.26786 | 0.028374 | | | |
| S28 | 2.343487 | 0.784577 | 1.543915 | 55.9512 | The Fourth Lens L24 |
| S29 | −1.34647 | 0.077746 | | | |
| S210 | −2.36135 | 0.26081 | 1.661342 | 20.3729 | The Fifth Lens L25 |
| S211 | 14.52963 | 0.511211 | | | |
| S212 | 1.406485 | 0.549178 | 1.543915 | 55.9512 | The Sixth Lens L26 |
| S213 | 1.366803 | 0.6 | | | |
| S214 | ∞ | 0.11 | 1.5168 | 64.16734 | Optical Filter OF2 |
| S215 | ∞ | 0.265285 | | | |

The aspheric surface sag z of each lens in table 4 can be calculated by the following formula:

$$z = ch^2/\{1+[1-(k+1)c^2h^2]^{1/2}\}+Ah^4\pm Bh^6+Ch^8+Dh^{10}+Eh^{12}+Fh^{14}+Gh^{16}$$

where c is curvature, h is the vertical distance from the lens surface to the optical axis, k is conic constant and A, B, C, D, E, F and G are aspheric coefficients.

In the second embodiment, the conic constant k and the aspheric coefficients A, B, C, D, E, F, G of each surface are shown in Table 5.

TABLE 5

| Surface Number | k | A | B | C |
|---|---|---|---|---|
| S21 | 0 | 0.070586858 | 0.001746118 | −0.002190434 |
| S22 | 0 | 0.13912209 | 0.004145135 | 0.007600384 |
| S23 | −2.05831 | −0.15488989 | −0.020407133 | 0.02871363 |
| S24 | −0.79915 | −0.0898881 | 0.37819194 | −0.32985267 |
| S26 | 8.572075 | 0.036314858 | −0.014995905 | −0.017187042 |
| S27 | 7.080266 | −0.013841259 | 0.009077003 | 0.06160044 |
| S28 | 0 | −0.025749599 | −0.053368665 | 0.004347418 |
| S29 | 0.12576 | −0.048728196 | 0.087895997 | 0.051770273 |
| S210 | −0.36144 | −0.041465539 | −0.086731745 | 0.02591413 |
| S211 | 0 | 0.088559288 | 0.037328103 | −0.006405607 |
| S212 | −4.12743 | −0.088353667 | 0.00194097 | 0.003038532 |
| S213 | −2.25677 | −0.12835343 | 0.03873446 | −0.008219529 |

| Surface Number | D | E | F | G |
|---|---|---|---|---|
| S21 | 0.000149405 | −6.61241E−06 | 3.49024E−05 | −4.12253E−05 |
| S22 | −0.006390471 | −0.004769568 | −0.003992185 | 0.002189127 |
| S23 | 0.014690139 | 0.002061809 | −0.007709073 | −0.000480932 |
| S24 | 0.17514926 | 3.095095 | 6.3520418 | −5.5812082 |
| S26 | 0.084819353 | −0.56342421 | −1.7749774 | 1.1892177 |
| S27 | 0.10030724 | 0.19922368 | −0.04030634 | −1.225248 |
| S28 | 0.024261301 | 0.03790053 | −0.004610073 | −0.10417861 |
| S29 | 0.027179641 | 0.011126124 | 0.036027992 | 0.076284967 |
| S210 | 0.08591691 | 0.063029254 | 1.99E−02 | −0.049858026 |
| S211 | −0.018407226 | −5.33E−03 | 2.51E−03 | 0.002457816 |
| S212 | 0.000655618 | −0.000244669 | 1.06E−05 | 4.41E−08 |
| S213 | 0.000519759 | 3.78E−04 | −1.58E−04 | 1.66E−05 |

Table 6 shows the parameters and condition values for conditions (7)-(12). As can be seen from Table 6, the wide-angle lens assembly 2 of the second embodiment satisfies the conditions (7)-(12).

TABLE 6

| | | | |
|---|---|---|---|
| $R2_{41}$ | 2.34349 mm | $R2_{42}$ | −1.34647 mm | SL2 | 3.62 mm |
| TTL2 | 4.95 mm | $f2_6$ | 22.7691 mm | f2 | 1.77306 mm |
| $Nd2_1$ | 1.54392 | $Vd2_1$ | 55.9512 | $Nd2_3$ | 1.54392 |
| $Vd2_3$ | 55.9512 | $Vd2_2$ | 55.9512 | $Vd2_6$ | 55.9512 |
| $(R2_{41} - R2_{42})/(R2_{41} + R2_{42})$ | 3.70 | SL2/TTL2 | 0.73 | $|f2_6/f2|$ | 12.84 |
| $(Nd2_1 \times Vd2_1)/(Nd2_3 \times Vd2_3)$ | 1 | $|Vd2_1 - Vd2_2|$ | 0 | | |
| $(Vd2_1 + Vd2_2)/Vd2_6$ | 2 | | | | |

Figure 4A:
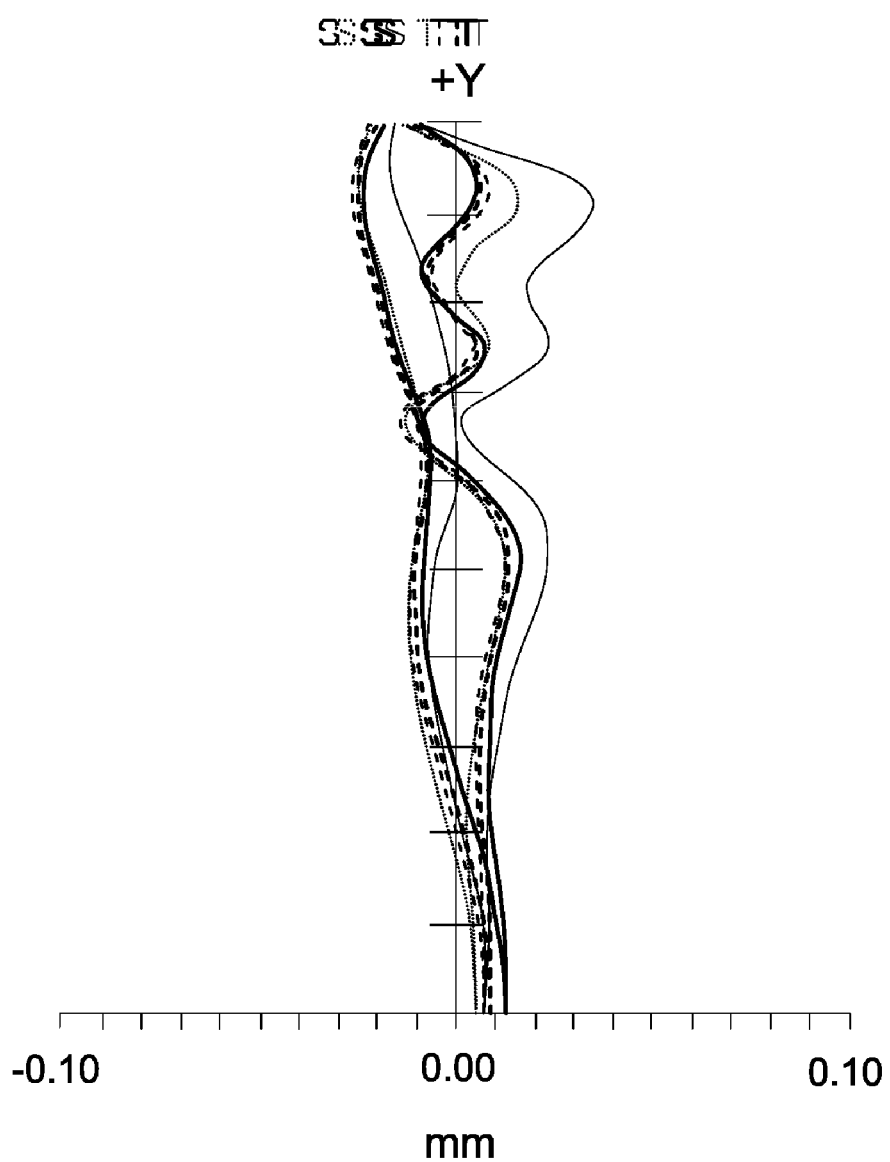
FIG. 4A depicts a field curvature diagram of the wide-angle lens assembly in accordance with the second embodiment of the invention.
Figure 4B:
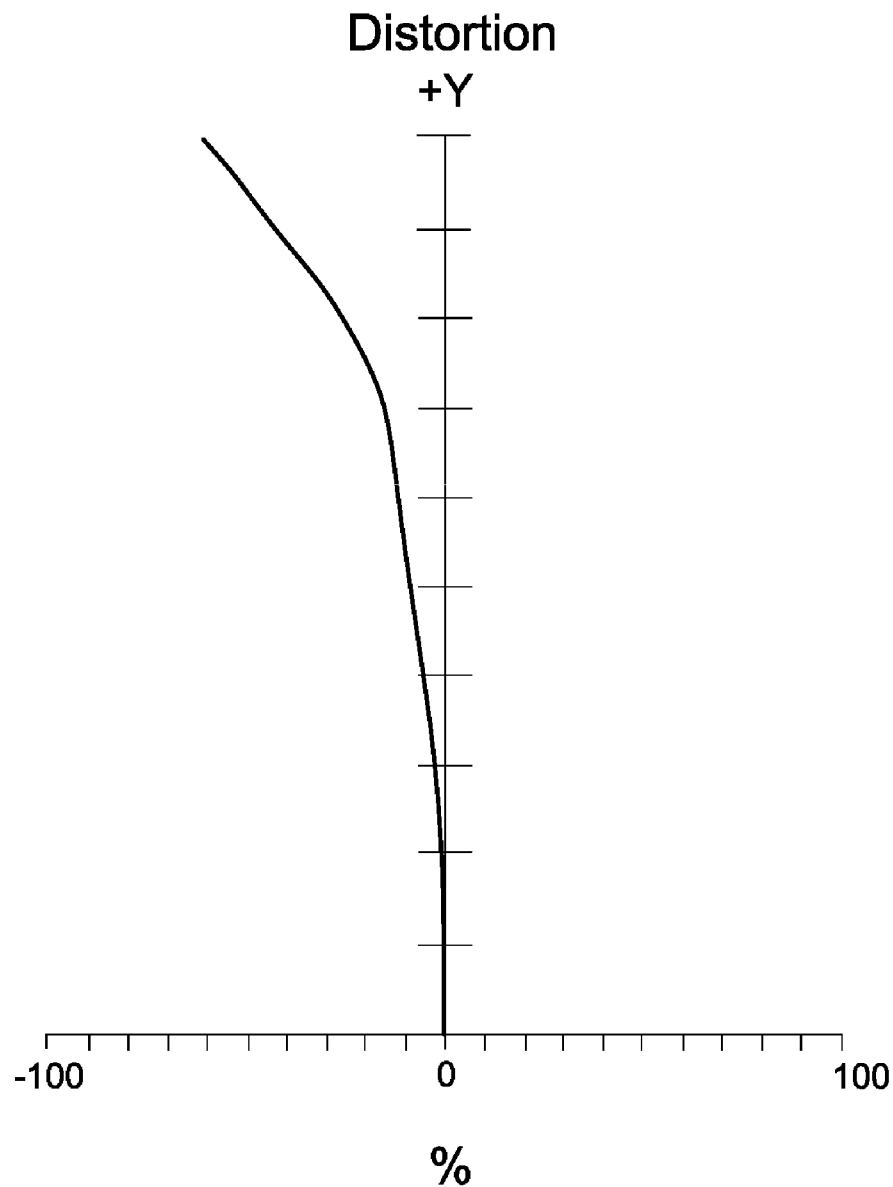
FIG. 4B is a distortion diagram of the wide-angle lens assembly in accordance with the second embodiment of the invention.
Figure 4C:
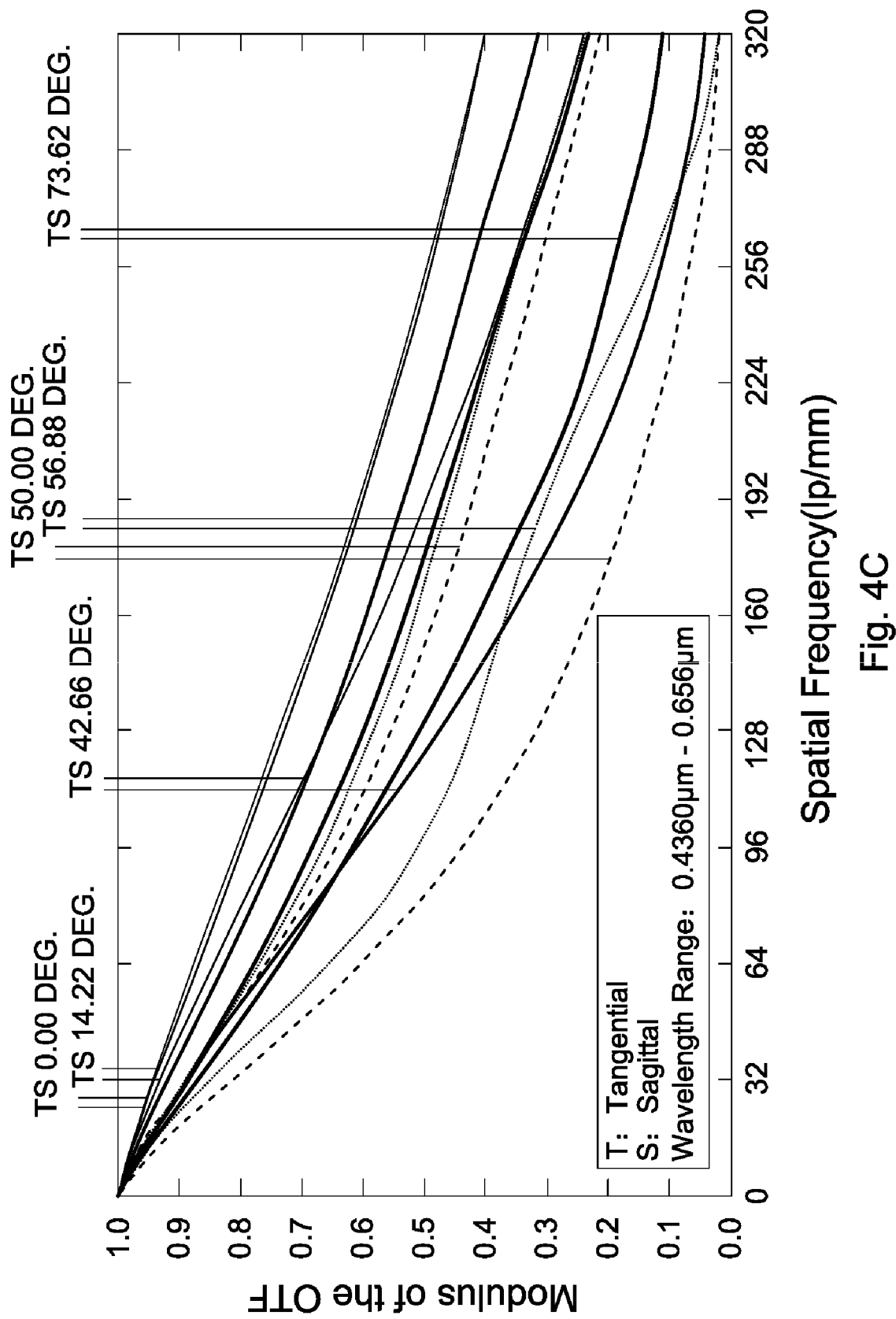
FIG. 4C is a modulation transfer function diagram of the wide-angle lens assembly in accordance with the second embodiment of the invention.

By the above arrangements of the lenses and stop ST2, the wide-angle lens assembly 2 of the second embodiment can meet the requirements of optical performance as seen in FIGS. 4A-4C, wherein FIG. 4A shows a field curvature diagram of the wide-angle lens assembly 2 in accordance with the second embodiment of the invention, FIG. 4B shows a distortion diagram of the wide-angle lens assembly 2 in accordance with the second embodiment of the invention, and FIG. 4C shows a modulation transfer function diagram of the wide-angle lens assembly 2 in accordance with the second embodiment of the invention.

It can be seen from FIG. 4A that the field curvature of tangential direction and sagittal direction in the wide-angle lens assembly 2 of the second embodiment ranges from −0.03 mm to 0.04 mm for the wavelength of 0.436 μm, 0.486 μm, 0.546 μm, 0.588 μm, and 0.656 μm.

It can be seen from FIG. 4B (in which the five lines in the figure almost coincide to appear as if a signal line) that the distortion in the wide-angle lens assembly 2 of the second embodiment ranges from −31% to 0% for the wavelength of 0.436 μm, 0.486 μm, 0.546 μm, 0.588 μm, and 0.656 μm.

It can be seen from FIG. 4C that the modulation transfer function of tangential direction and sagittal direction in the wide-angle lens assembly 2 of the second embodiment ranges from 0.0 to 1.0 wherein the wavelength ranges from 0.436 μm to 0.656 μm, the fields respectively are 0.00 degree, 14.22 degrees, 42.66 degrees, 50.00 degrees, 56.88 degrees, and 73.62 degrees, and the spatial frequency ranges from 0 lp/mm to 320 lp/mm.

It is obvious that the field curvature and the distortion of the wide-angle lens assembly 2 of the second embodiment can be corrected effectively, and the resolution of the wide-angle lens assembly 2 of the second embodiment can meet the requirement. Therefore, the wide-angle lens assembly 2 of the second embodiment is capable of good optical performance.

Referring to FIG. 5, FIG. 5 is a lens layout diagram of a wide-angle lens assembly in accordance with a third embodiment of the invention. The wide-angle lens assembly 3 includes a first lens L31, a second lens L32, a stop ST3, a third lens L33, a fourth lens L34, a fifth lens L35, a sixth lens L36, and an optical filter OF3, all of which are arranged in order from an object side to an image side along an optical axis OA3. In operation, an image of light rays from the object side is formed at an image plane IMA3.

The first lens L31 is a meniscus lens with positive refractive power and made of plastic material, wherein the object side surface S31 is a convex surface, the image side surface S32 is a concave surface, and both of the object side surface S31 and image side surface S32 are aspheric surfaces.

The second lens L32 is a meniscus lens with negative refractive power and made of plastic material, wherein the object side surface S33 is a convex surface, the image side surface S34 is a concave surface, and both of the object side surface S33 and image side surface S34 are aspheric surfaces.

The third lens L33 is a biconvex lens with positive refractive power and made of plastic material, wherein the object side surface S36 is a convex surface, the image side surface S37 is a convex surface, and both of the object side surface S36 and image side surface S37 are aspheric surfaces.

The fourth lens L34 is a biconvex lens with positive refractive power and made of plastic material, wherein the object side surface S38 is a convex surface, the image side surface S39 is a convex surface, and both of the object side surface S38 and image side surface S39 are aspheric surfaces.

The fifth lens L35 is a meniscus lens with negative refractive power and made of plastic material, wherein the object side surface S310 is a concave surface, the image side surface S311 is a convex surface, and both of the object side surface S310 and image side surface S311 are aspheric surfaces.

The sixth lens L36 is a meniscus lens with negative refractive power and made of plastic material, wherein the object side surface S312 is a convex surface, the image side surface S313 is a concave surface, and both of the object side surface S312 and image side surface S313 are aspheric surfaces.

Both of the object side surface S314 and image side surface S315 of the optical filter OF3 are plane surfaces.

In order to maintain excellent optical performance of the wide-angle lens assembly in accordance with the third embodiment of the invention, the wide-angle lens assembly 3 satisfies at least one of the following conditions:

$$0.61 < (R3_{41} - R3_{42})/(R3_{41} + R3_{42}) < 5.60 \tag{13}$$

$$0.4 < SL3/TTL3 < 0.8 \tag{14}$$

$$1.54 \leq |f3_6/f3| \leq 13.37 \tag{15}$$

$$1.00 \leq (Nd3_1 \times Vd3_1)/(Nd3_3 \times Vd3_3) < 1.29 \tag{16}$$

$$0 \leq |Vd3_1 - Vd3_2| < 36 \tag{17}$$

$$0.6 < (Vd3_1 + Vd3_2)/Vd3_6 < 5.5 \tag{18}$$

The definition of $R3_{41}$, $R3_{42}$, SL3, TTL3, $f3_6$, f3, $Nd3_1$, $Nd3_3$, $Vd3_1$, $Vd3_2$, $Vd3_3$, and $Vd3_6$ are the same as that of $R1_{41}$, $R1_{42}$, SL1, TTL1, $f1_6$, f1, $Nd1_1$, $Nd1_3$, $Vd1_1$, $Vd1_2$, $Vd1_3$, and $Vd1_6$ in the first embodiment, and is not described here again.

By the above design of the lenses, stop ST3, and satisfies at least one of the conditions (13)-(18), the wide-angle lens assembly 3 is provided with an effective shortened total lens length, an effective decreased F-number, an effective increased field of view, an effective increased resolution, and an effective corrected aberration.

In order to achieve the above purposes and effectively enhance the optical performance, the wide-angle lens assembly 3 in accordance with the third embodiment of the invention is provided with the optical specifications shown in Table 7, which include the effective focal length, F-number, total lens length, field of view, radius of curvature of each lens surface, thickness between adjacent surface, refractive index of each lens, and Abbe number of each lens. Table 7 shows that the effective focal length is equal to 1.80064 mm, F-number is equal to 2.4, total lens length is equal to 4.01 mm, and field of view is equal to 145 degrees for the wide-angle lens assembly 3 of the third embodiment of the invention.

TABLE 7

Effective Focal Length = 1.80064 mm F-number = 2.4
Total Lens Length = 4.01 mm Field of View = 145 Degrees

| Surface Number | Radius of Curvature (mm) | Thickness (mm) | Nd | Vd | Remark |
|---|---|---|---|---|---|
| S31 | 21.56902 | 0.285896 | 1.543915 | 55.9512 | The First Lens L31 |

TABLE 7-continued

Effective Focal Length = 1.80064 mm F-number = 2.4
Total Lens Length = 4.01 mm Field of View = 145 Degrees

| Surface Number | Radius of Curvature (mm) | Thickness (mm) | Nd | Vd | Remark |
|---|---|---|---|---|---|
| S32 | 1790.377 | 0.025303 | | | |
| S33 | 0.812982 | 0.253746 | 1.661342 | 20.3729 | The Second Lens L32 |
| S34 | 0.485545 | 0.493987 | | | |
| S35 | ∞ | 0.02327 | | | Stop ST3 |
| S36 | 2.352661 | 0.395475 | 1.543915 | 55.9512 | The Third Lens L33 |
| S37 | −2.90972 | 0.066223 | | | |
| S38 | 1.78233 | 0.692514 | 1.543915 | 55.9512 | The Fourth Lens L34 |
| S39 | −1.23945 | 0.088059 | | | |
| S310 | −1.66863 | 0.30473 | 1.661342 | 20.3729 | The Fifth Lens L35 |
| S311 | −30.7694 | 0.338836 | | | |
| S312 | 0.97135 | 0.337698 | 1.543915 | 55.9512 | The Sixth Lens L36 |
| S313 | 0.793392 | 0.55 | | | |
| S314 | ∞ | 0.11 | 1.5168 | 64.16734 | Optical Filter OF3 |
| S315 | ∞ | 0.046867 | | | |

The aspheric surface sag z of each lens in table 7 can be calculated by the following formula:

$$z = ch^2 / \{1 + [1-(k+1)c^2h^2]^{1/2}\} + Ah^4 \pm Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the third embodiment, the conic constant k and the aspheric coefficients A, B, C, D, E, F, G of each surface are shown in Table 8.

TABLE 8

| Surface Number | k | A | B | C |
|---|---|---|---|---|
| S31 | 0 | 0.043759437 | 0.004692789 | −0.007760096 |
| S32 | 3536528 | 0.17986113 | −0.064097666 | 0.034190742 |
| S33 | −1.03317 | −0.22169684 | −0.15833879 | 0.062777604 |
| S34 | −0.96522 | −0.28268593 | −0.090476053 | 0.28362445 |
| S36 | 5.156712 | 0.035621146 | −0.16830903 | −0.63915089 |
| S37 | 7.708198 | 0.002010855 | −0.14250048 | −0.17841963 |
| S38 | 0 | −0.020906035 | −0.11986826 | 0.064878738 |
| S39 | 0.400481 | −0.10722143 | 0.1162819 | 0.13445956 |
| S310 | −1.37144 | −0.058335324 | −0.17258436 | −0.03207042 |
| S311 | 0 | 0.15231858 | 0.058836319 | −0.005111873 |
| S312 | −4.36355 | −0.14958919 | 0.009108915 | 0.012309397 |
| S313 | −3.17058 | −0.15485436 | 0.075973111 | −0.030253959 |

| Surface Number | D | E | F | G |
|---|---|---|---|---|
| S31 | −0.004801426 | −0.002058524 | 0.000379298 | 0.000126838 |
| S32 | 0.015954935 | −0.021788176 | −0.041307101 | 0.013970104 |
| S33 | 0.20273663 | 0.23236142 | −0.040620563 | −0.1577675 |
| S34 | −0.49551427 | 2.4901351 | 4.9537419 | 24.150335 |
| S36 | 0.53806608 | 3.1568184 | 1.6109862 | −45.598485 |
| S37 | 0.16971408 | 2.1802198 | 1.9651255 | −19.466469 |
| S38 | 0.16056284 | 0.17425442 | 0.12008256 | −0.3769127 |
| S39 | 0.1264808 | 0.059958862 | 0.059428822 | 0.43423147 |
| S310 | 0.19863737 | 0.29735803 | 8.34E−02 | −0.7227685 |
| S311 | −0.075090664 | −4.24E−03 | 3.45E−02 | −0.011172776 |
| S312 | 0.003841462 | −0.002896402 | 2.90E−04 | 2.43E−05 |
| S313 | 0.002934241 | 4.14E−03 | −2.24E−03 | 3.29E−04 |

Table 9 shows the parameters and condition values for conditions (13)-(18). As can be seen from Table 9, the wide-angle lens assembly 3 of the third embodiment satisfies the conditions (13)-(18).

TABLE 9

| | | | | | |
|---|---|---|---|---|---|
| $R3_{41}$ | 1.78233 mm | $R3_{42}$ | −1.23945 mm | SL3 | 2.95 mm |
| TTL3 | 4.01 mm | $f3_6$ | −24.058 mm | f3 | 1.80064 mm |
| $Nd3_1$ | 1.543915 | $Vd3_1$ | 55.9512 | $Nd3_3$ | 1.543915 |
| $Vd3_3$ | 55.9512 | $Vd3_2$ | 20.3729 | $Vd3_6$ | 55.9512 |
| $(R3_{41} - R3_{42})/(R3_{41} + R3_{42})$ | 5.57 | SL3/TTL3 | 0.74 | $|f3_6/f3|$ | 13.36 |
| $(Nd3_1 \times Vd3_1)/(Nd3_3 \times Vd3_3)$ | 1 | $|Vd3_1 - Vd3_2|$ | 35.58 | | |
| $(Vd3_1 + Vd3_2)/Vd3_6$ | 1.36 | | | | |

Figure 6A:
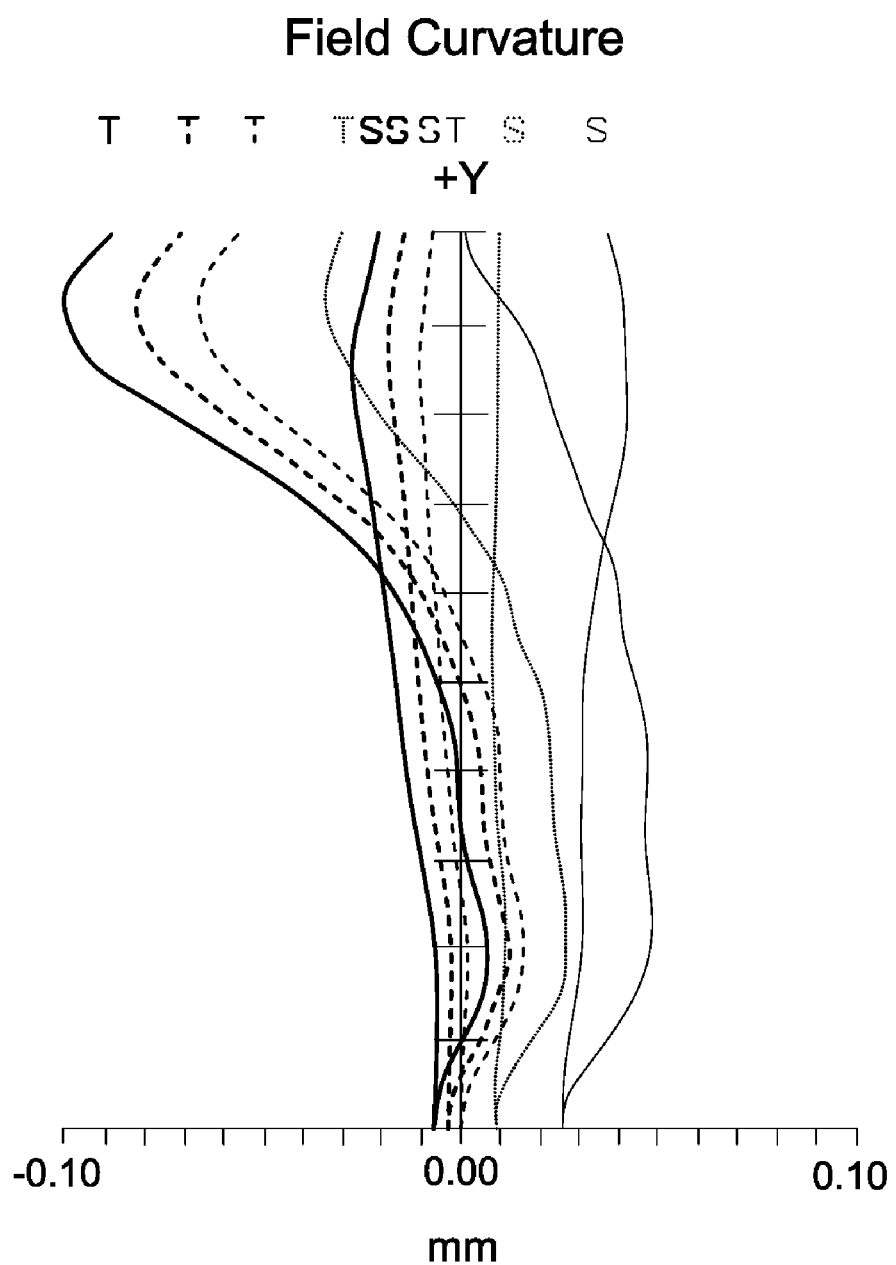
FIG. 6A depicts a field curvature diagram of the wide-angle lens assembly in accordance with the third embodiment of the invention.
Figure 6B:
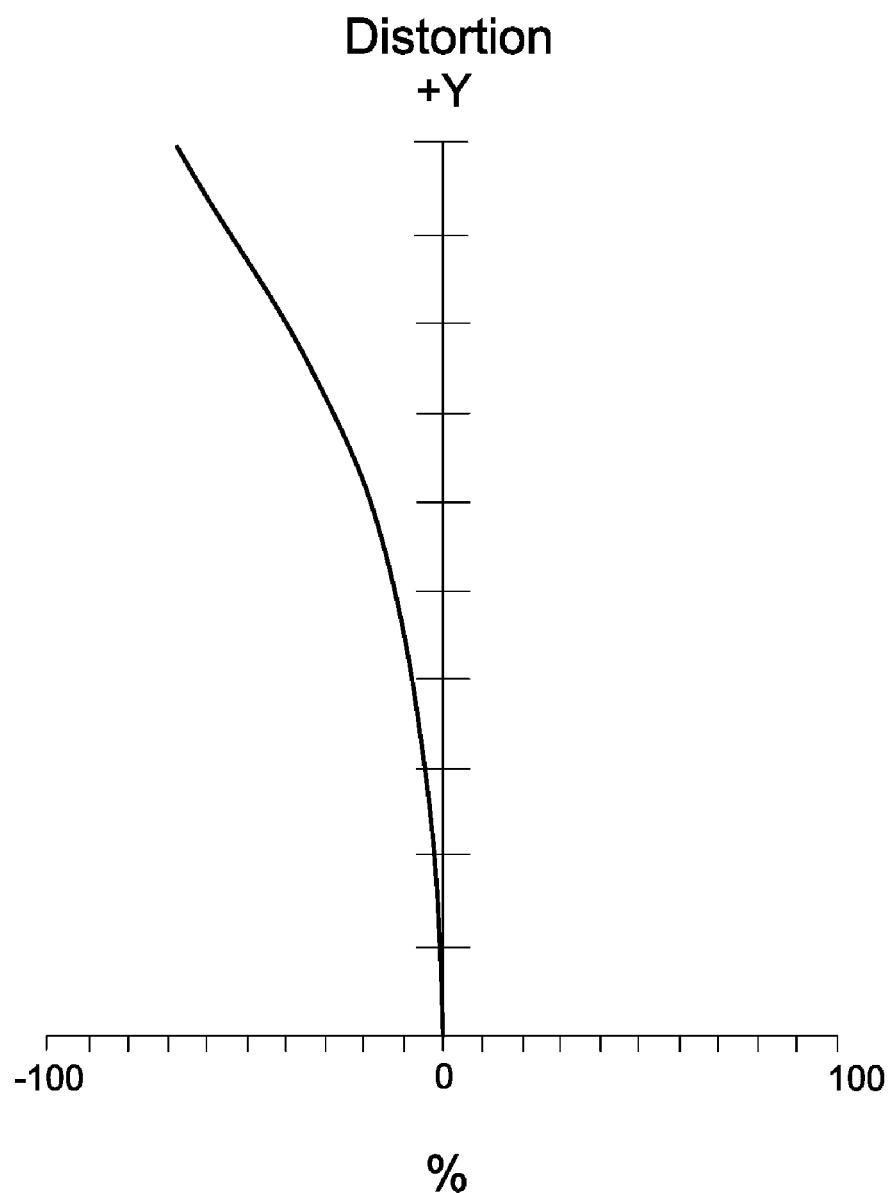
FIG. 6B is a distortion diagram of the wide-angle lens assembly in accordance with the third embodiment of the invention.
Figure 6C:
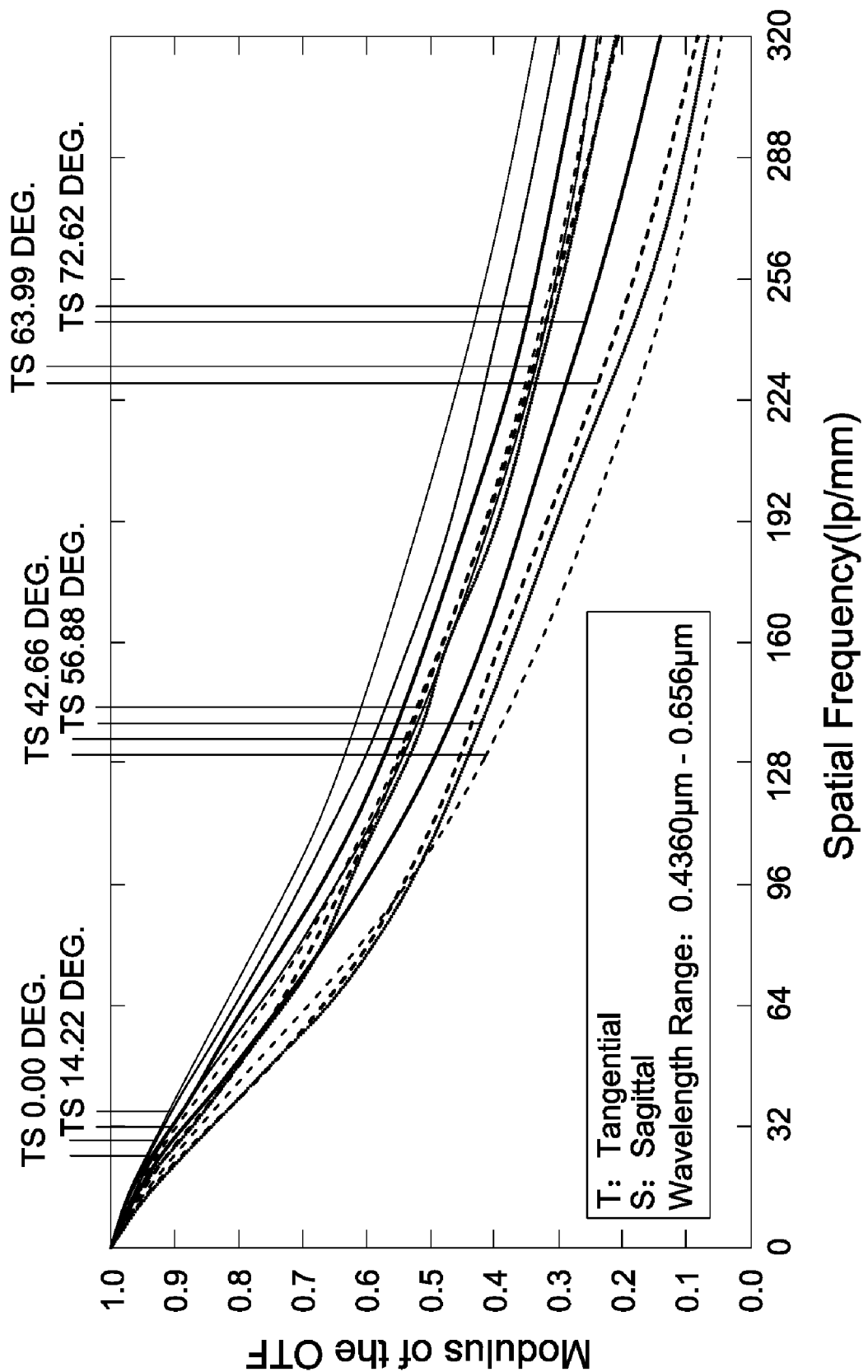
FIG. 6C is a modulation transfer function diagram of the wide-angle lens assembly in accordance with the third embodiment of the invention.

By the above arrangements of the lenses and stop ST3, the wide-angle lens assembly 3 of the third embodiment can meet the requirements of optical performance as seen in FIGS. 6A-6C, wherein FIG. 6A shows a field curvature diagram of the wide-angle lens assembly 3 in accordance with the third embodiment of the invention, FIG. 6B shows a distortion diagram of the wide-angle lens assembly 3 in accordance with the third embodiment of the invention, and FIG. 6C shows a modulation transfer function diagram of the wide-angle lens assembly 3 in accordance with the third embodiment of the invention.

It can be seen from FIG. 6A that the field curvature of tangential direction and sagittal direction in the wide-angle lens assembly 3 of the third embodiment ranges from −0.10 mm to 0.05 mm for the wavelength of 0.436 μm, 0.486 μm, 0.546 μm, 0.588 μm, and 0.656 μm.

It can be seen from FIG. 6B (in which the five lines in the figure almost coincide to appear as if a signal line) that the distortion in the wide-angle lens assembly 3 of the third embodiment ranges from −75% to 0% for the wavelength of 0.436 μm, 0.486 μm, 0.546 μm, 0.588 μm, and 0.656 μm.

It can be seen from FIG. 6C that the modulation transfer function of tangential direction and sagittal direction in the wide-angle lens assembly 3 of the third embodiment ranges from 0.0 to 1.0 wherein the wavelength ranges from 0.436 μm to 0.656 μm, the fields respectively are 0.00 degree, 14.22 degrees, 42.66 degrees, 56.88 degrees, 63.99 degrees, and 72.62 degrees, and the spatial frequency ranges from 0 lp/mm to 320 lp/mm.

It is obvious that the field curvature and the distortion of the wide-angle lens assembly 3 of the third embodiment can be corrected effectively, and the resolution of the wide-angle lens assembly 3 of the third embodiment can meet the requirement. Therefore, the wide-angle lens assembly 3 of the third embodiment is capable of good optical performance.

Figure 7:
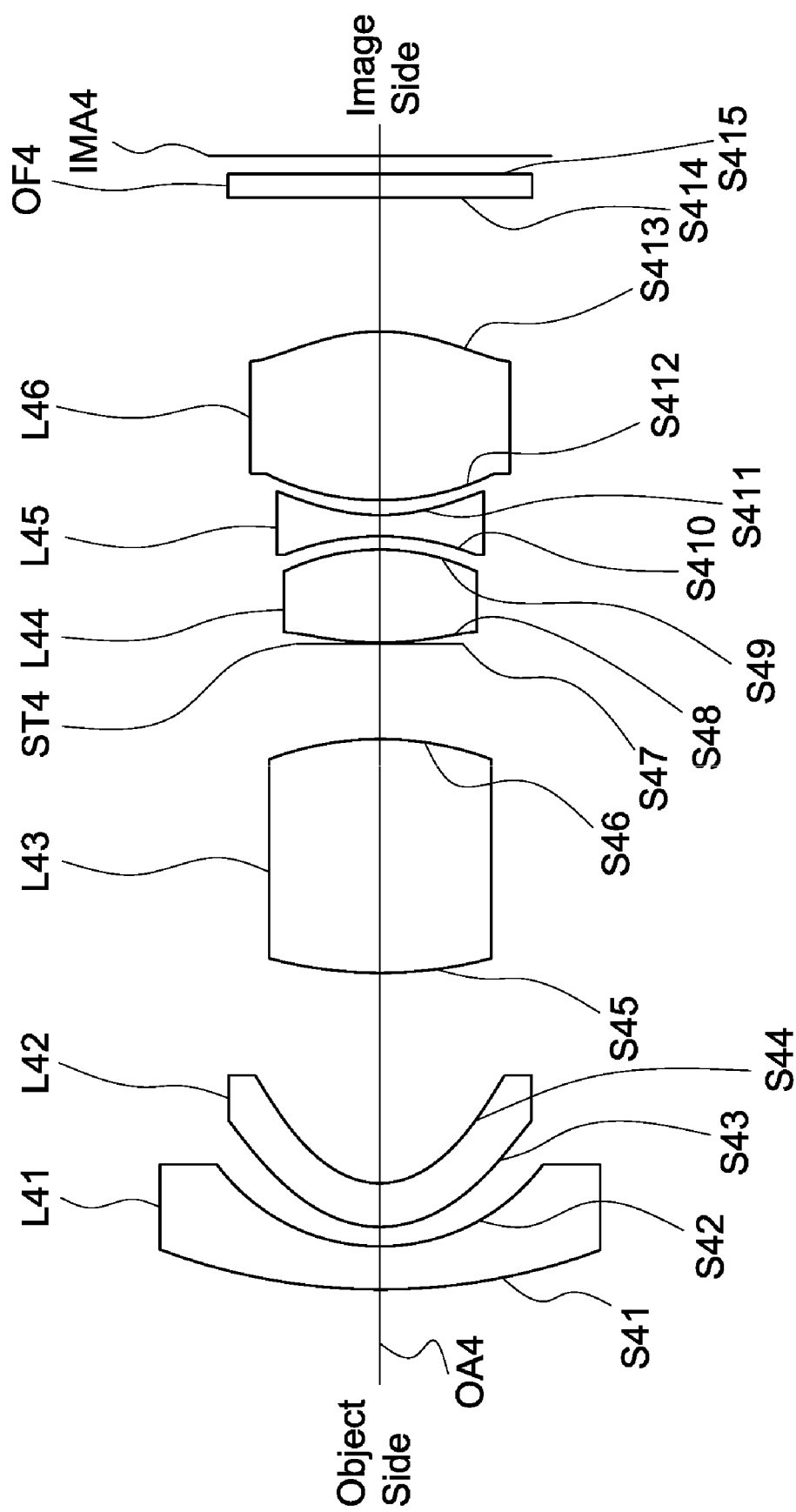
FIG. 7 is a lens layout diagram of a wide-angle lens assembly in accordance with a fourth embodiment of the invention.

Referring to FIG. 7, FIG. 7 is a lens layout diagram of a wide-angle lens assembly in accordance with a fourth embodiment of the invention. The wide-angle lens assembly 4 includes a first lens L41, a second lens L42, a third lens L43, a stop ST4, a fourth lens L44, a fifth lens L45, a sixth lens L46, and an optical filter OF4, all of which are arranged in order from an object side to an image side along an optical axis OA4. In operation, an image of light rays from the object side is formed at an image plane IMA4.

The first lens L41 is a meniscus lens with negative refractive power and made of glass material, wherein the object side surface S41 is a convex surface, the image side surface S42 is a concave surface, and both of the object side surface S41 and image side surface S42 are spherical surfaces.

The second lens L42 is a meniscus lens with negative refractive power and made of plastic material, wherein the object side surface S43 is a convex surface, the image side surface S44 is a concave surface, and both of the object side surface S43 and image side surface S44 are aspheric surfaces.

The third lens L43 is a biconvex lens with positive refractive power and made of glass material, wherein the object side surface S45 is a convex surface, the image side surface S46 is a convex surface, and both of the object side surface S45 and image side surface S46 are spherical surfaces.

The fourth lens L44 is a biconvex lens with positive refractive power and made of plastic material, wherein the object side surface S48 is a convex surface, the image side surface S49 is a convex surface, and both of the object side surface S48 and image side surface S49 are aspheric surfaces.

The fifth lens L45 is a biconcave lens with negative refractive power and made of plastic material, wherein the object side surface S410 is a concave surface, the image side surface S411 is a concave surface, and both of the object side surface S410 and image side surface S411 are aspheric surfaces.

The sixth lens L46 is a biconvex lens with positive refractive power and made of plastic material, wherein the object side surface S412 is a convex surface, the image side surface S413 is a convex surface, and both of the object side surface S412 and image side surface S413 are aspheric surfaces.

Both of the object side surface S414 and image side surface S415 of the optical filter OF4 are plane surfaces.

In order to maintain excellent optical performance of the wide-angle lens assembly in accordance with the fourth embodiment of the invention, the wide-angle lens assembly 4 satisfies at least one of the following conditions:

$$0.61 < (R4_{41} - R4_{42})/(R4_{41} + R4_{42}) < 5.60 \tag{19}$$

$$0.4 < SL4/TTL4 < 0.8 \tag{20}$$

$$1.54 \leq |f4_6/f4| \leq 13.37 \tag{21}$$

$$1.00 \leq (Nd4_1 \times Vd4_1)/(Nd4_3 \times Vd4_3) < 1.29 \tag{22}$$

$$0 \leq |Vd4_1 - Vd4_2| < 36 \tag{23}$$

$$0.6 < (Vd4_1 + Vd4_2)/Vd4_6 < 5.5 \tag{24}$$

$$0.65 < |f4_{456}/f4_{123}| < 1.95 \tag{25}$$

$$4.4 < TTL4/EPP4 < 6.2 \tag{26}$$

The definition of $R4_{41}$, $R4_{42}$, SL4, TTL4, $f4_6$, f4, $Nd4_1$, $Nd4_3$, $Vd4_1$, $Vd4_2$, $Vd4_3$, and $Vd4_6$ are the same as that of $R1_{41}$, $R1_{42}$, SL1, TTL1, $f1_6$, f1, $Nd1_1$, $Nd1_3$, $Vd1_1$, $Vd1_2$, $Vd1_3$, and $Vd1_6$ in the first embodiment, and is not described here again. $f4_{123}$ is an effective focal length of a combination of the first lens L41, the second lens L42, and the third lens L43. $f4_{456}$ is an effective focal length of a combination of the fourth lens L44, the fifth lens L45, and the sixth lens L46. EPP4 is an entrance pupil position.

By the above design of the lenses, stop ST4, and satisfies at least one of the conditions (19)-(26), the wide-angle lens assembly 4 is provided with an effective shortened total lens length, an effective decreased F-number, an effective increased field of view, an effective increased resolution, and an effective corrected aberration.

In order to achieve the above purposes and effectively enhance the optical performance, the wide-angle lens assembly 4 in accordance with the fourth embodiment of the invention is provided with the optical specifications shown in Table 10, which include the effective focal length, F-number, total lens length, field of view, radius of curvature of each lens surface, thickness between adjacent surface, refractive index of each lens, and Abbe number of each lens. Table 10 shows that the effective focal length is equal to 3.171 mm, F-number is equal to 1.8, total lens length is equal to 23.548 mm, and field of view is equal to 92.9 degrees for the wide-angle lens assembly 4 of the fourth embodiment of the invention.

TABLE 10

Effective Focal Length = 3.171 mm F-number = 1.8
Total Lens Length = 23.548 mm Field of View = 92.9 Degrees

| Surface Number | Radius of Curvature (mm) | Thickness (mm) | Nd | Vd | Remark |
|---|---|---|---|---|---|
| S41 | 13.352 | 0.908 | 1.883 | 40.81 | The First Lens L41 |
| S42 | 4.297 | 0.411 | | | |
| S43 | 2.357 | 0.922 | 1.643 | 22.44 | The Second Lens L42 |
| S44 | 1.620 | 4.432 | | | |
| S45 | 8.528 | 4.945 | 1.613 | 36.96 | The Third Lens L43 |
| S46 | −6.758 | 2.023 | | | |
| S47 | ∞ | 0.020 | | | Stop ST4 |
| S48 | 6.810 | 1.962 | 1.531 | 55.84 | The Fourth Lens L44 |
| S49 | −4.186 | 0.282 | | | |
| S410 | −5.361 | 0.446 | 1.651 | 21.51 | The Fifth Lens L45 |
| S411 | 3.658 | 0.315 | | | |
| S412 | 5.466 | 3.564 | 1.531 | 55.84 | The Sixth Lens L46 |
| S413 | −3.856 | 2.819 | | | |
| S414 | ∞ | 0.500 | 1.517 | 64.17 | Optical Filter OF4 |
| S415 | ∞ | 0 | | | |

The aspheric surface sag z of each lens in table 10 can be calculated by the following formula:

$$z = ch^2/\{1+[1-(k+1)c^2h^2]^{1/2}\} + Ah^4 + Bh^6 + Ch^8 + Dh^{10}$$

where c is curvature, h is the vertical distance from the lens surface to the optical axis, k is conic constant and A, B, C and D are aspheric coefficients.

In the fourth embodiment, the conic constant k and the aspheric coefficients A, B, C, D of each surface are shown in Table 11.

TABLE 11

| Surface Number | k | A | B | C | D |
|---|---|---|---|---|---|
| S43 | −0.899630 | 4.83E−04 | 4.92E−05 | −6.34E−06 | −5.77E−07 |
| S44 | −0.828139 | −9.80E−04 | 1.64E−05 | −3.29E−05 | −3.86E−06 |
| S48 | −5.624879 | −0.000655 | 0.0002250 | −1.82E−04 | 0 |
| S49 | −4.803801 | 5.68E−03 | −0.002183 | 3.71E−05 | 0 |
| S410 | −2.180941 | 0.0002241 | −6.73E−04 | 5.90E−05 | 0 |
| S411 | −6.30066 | −0.000368 | 0.0004716 | −1.19E−05 | 0 |
| S412 | −5.793683 | 0.0026576 | 1.74E−04 | −7.63E−06 | 0 |

Table 12 shows the parameters and condition values for conditions (19)-(26). As can be seen from Table 12, the wide-angle lens assembly 4 of the fourth embodiment satisfies the conditions (19)-(26).

TABLE 12

| | | | | | |
|---|---|---|---|---|---|
| $R4_{41}$ | 6.810 mm | $R4_{42}$ | −4.186 mm | SL4 | 9.907 mm |
| TTL4 | 23.548 mm | $f4_6$ | 4.909 mm | f4 | 3.171 mm |
| $Nd4_1$ | 1.883 | $Vd4_1$ | 40.81 | $Nd4_3$ | 1.613 |
| $Vd4_3$ | 36.96 | $Vd4_2$ | 22.44 | $Vd4_6$ | 55.84 |
| $f4_{456}$ | 7.56 mm | $f4_{123}$ | 8.681 mm | EPP4 | 5.074 mm |
| $(R4_{41} - R4_{42})/(R4_{41} + R4_{42})$ | 4.191 | SL4/TTL4 | 0.42 | $|f4_6/f4|$ | 1.55 |
| $(Nd4_1 \times Vd4_1)/(Nd4_3 \times Vd4_3)$ | 1.289 | $|Vd4_1 - Vd4_2|$ | 18.37 | TTL4/EPP4 | 4.641 |
| $(Vd4_1 + Vd4_2)/Vd4_6$ | 1.13 | $|f4_{456}/f4_{123}|$ | 0.871 | | |

Figure 8A:
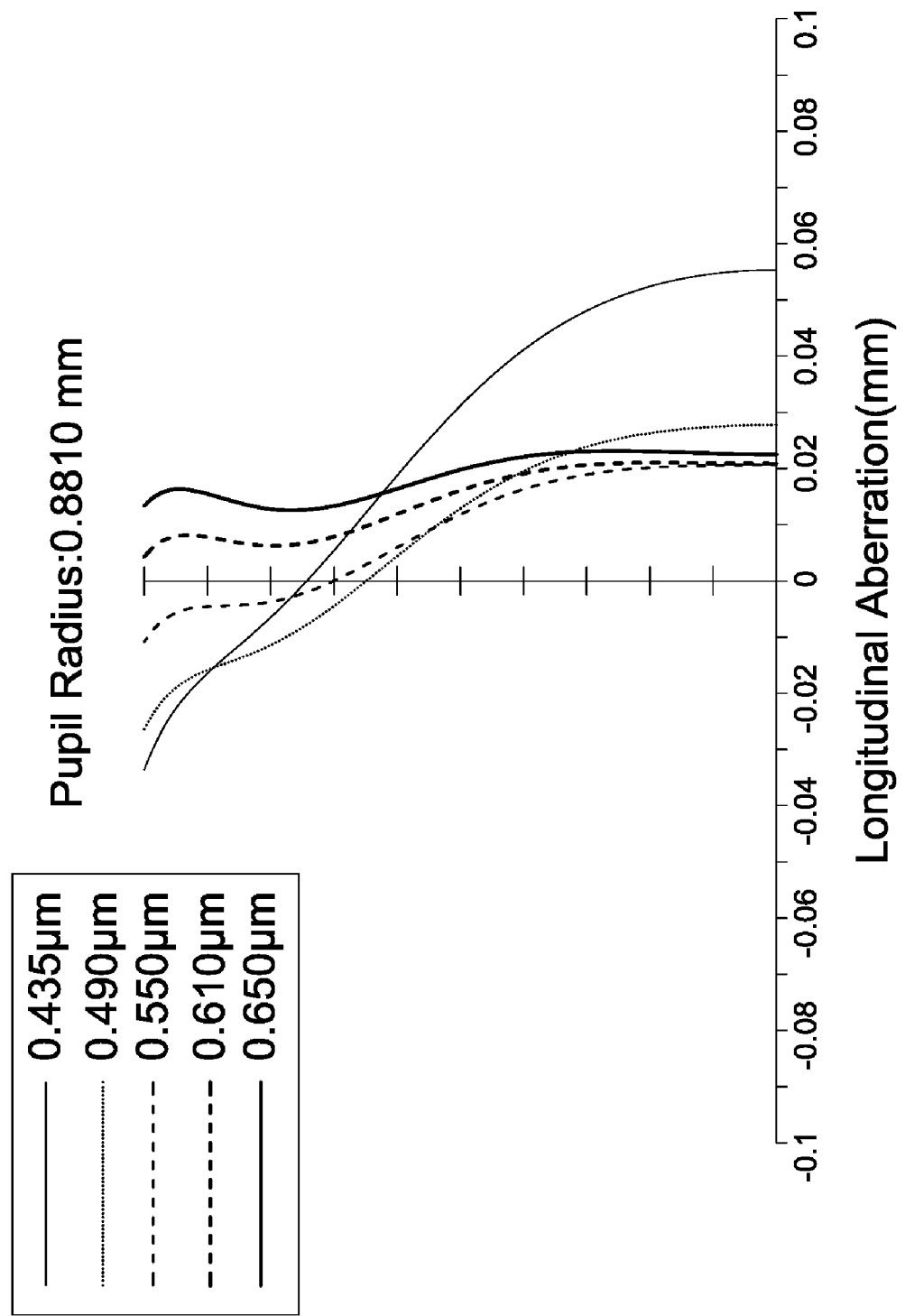
FIG. 8A depicts a longitudinal aberration diagram of the wide-angle lens assembly in accordance with the fourth embodiment of the invention.
Figure 8B:
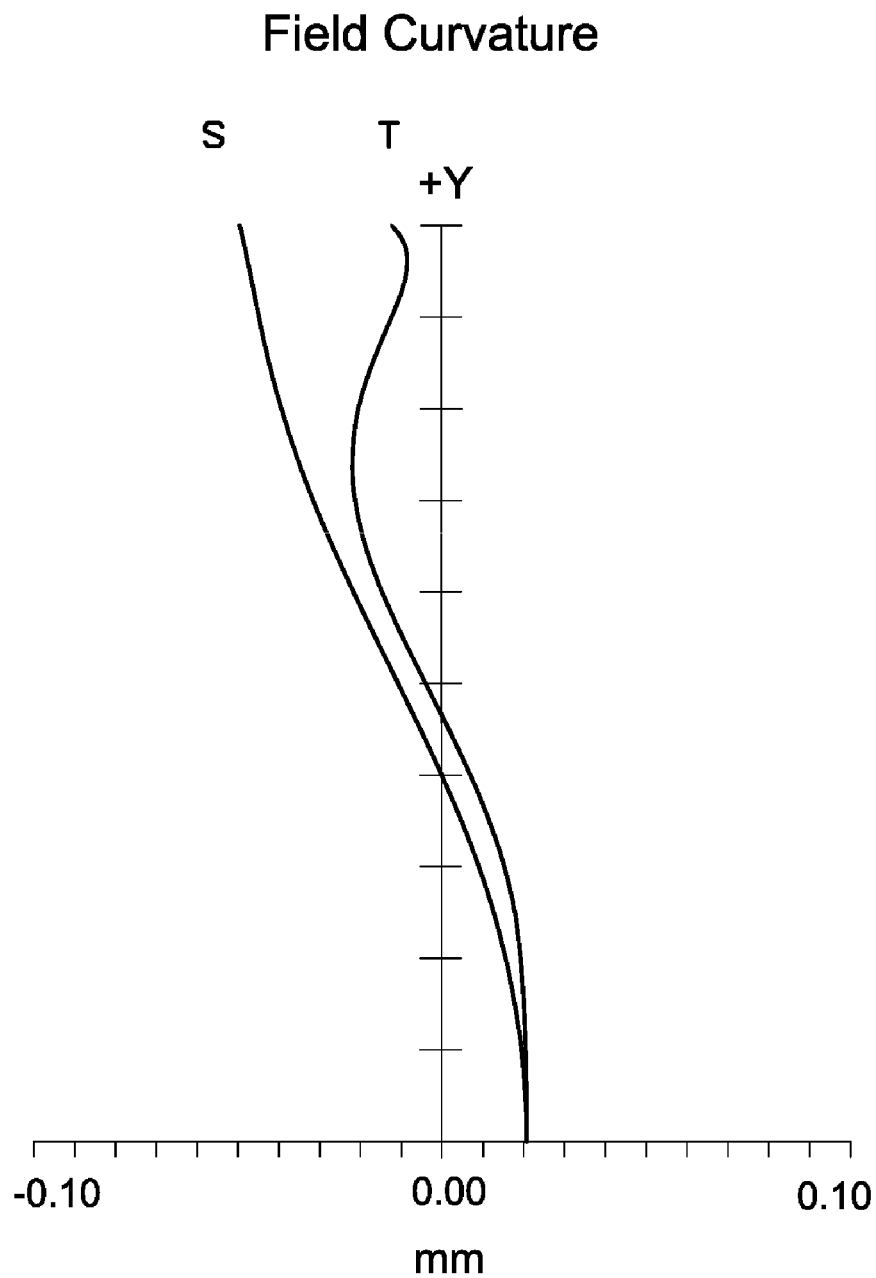
FIG. 8B is a field curvature diagram of the wide-angle lens assembly in accordance with the fourth embodiment of the invention.
Figure 8C:
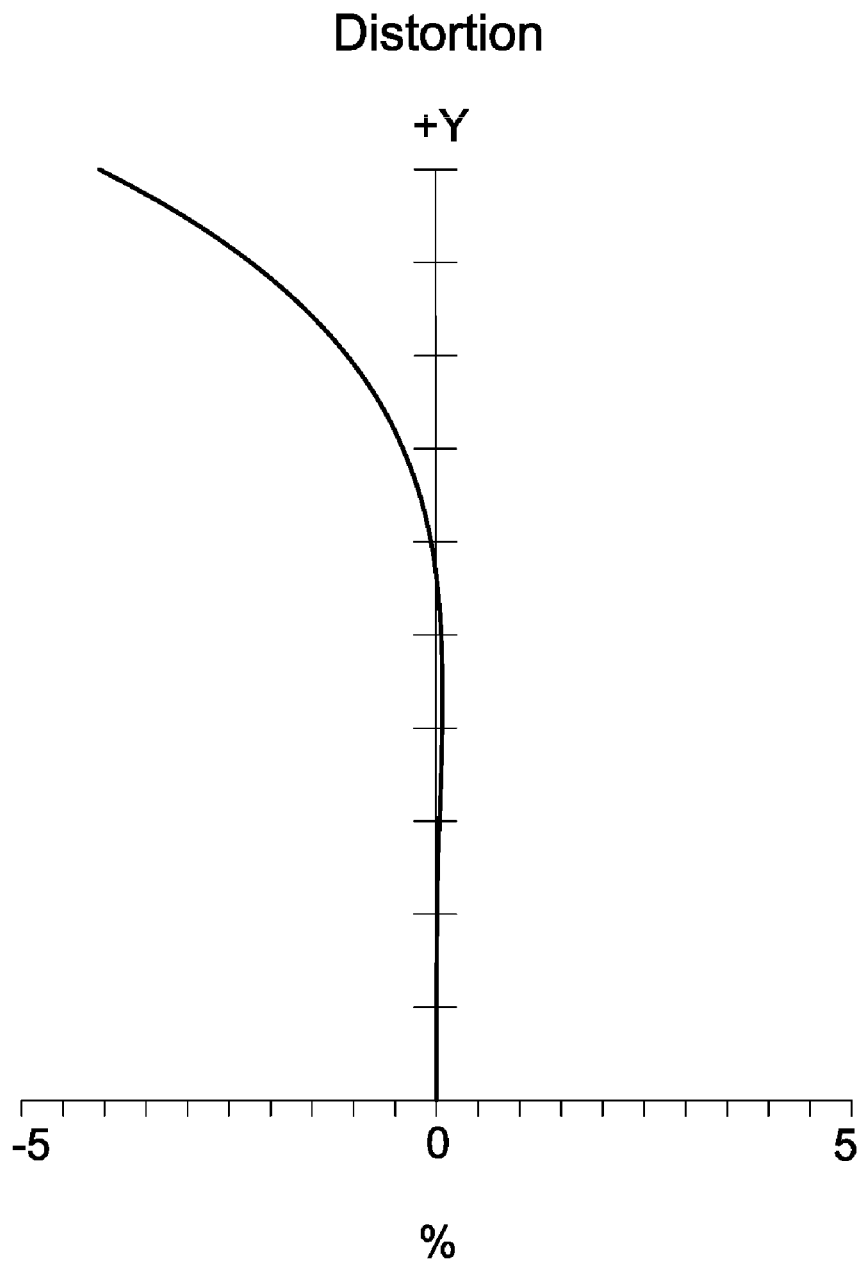
FIG. 8C is a distortion diagram of the wide-angle lens assembly in accordance with the fourth embodiment of the invention.
Figure 8D:
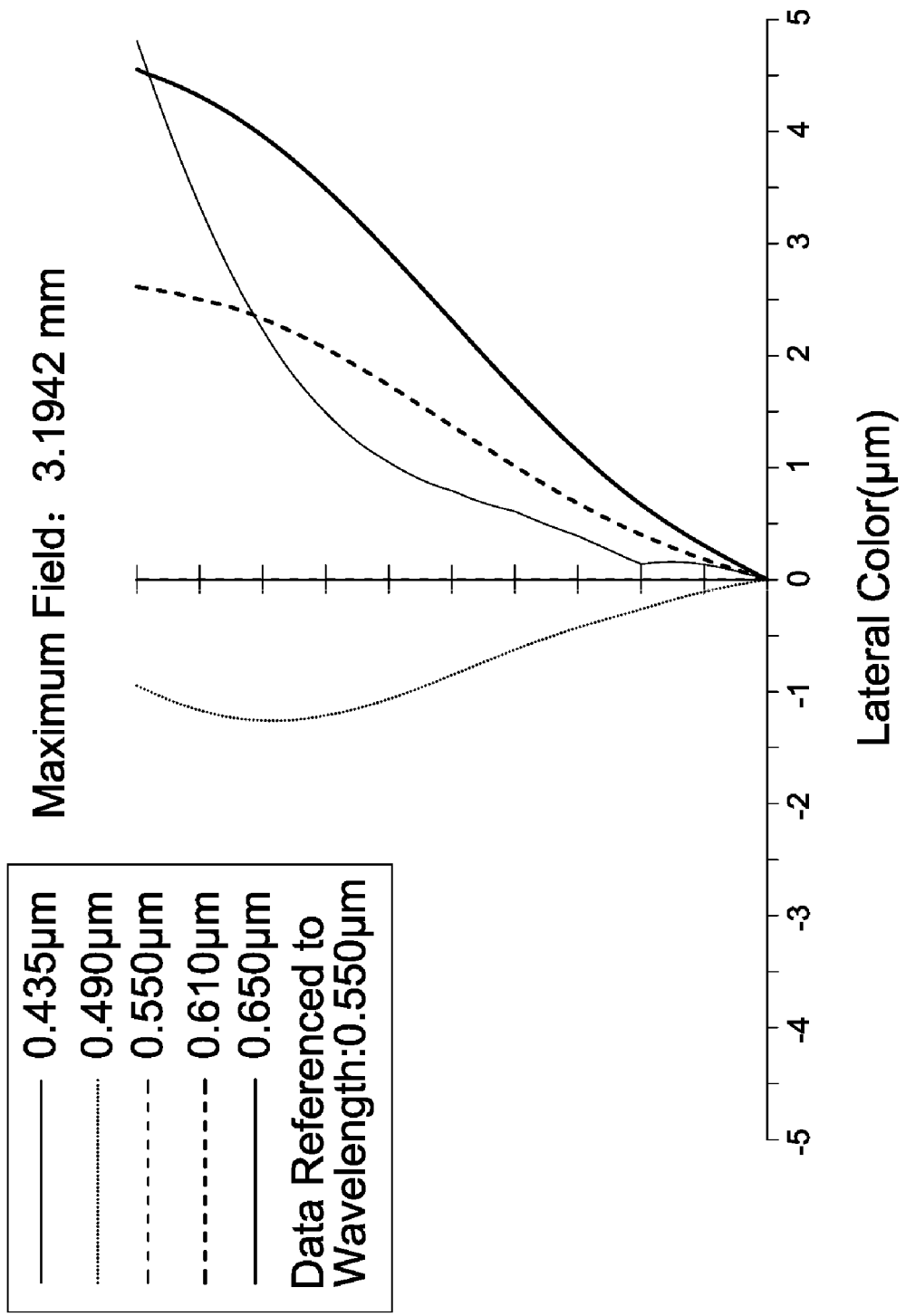
FIG. 8D is a lateral color diagram of the wide-angle lens assembly in accordance with the fourth embodiment of the invention.
Figure 8E:
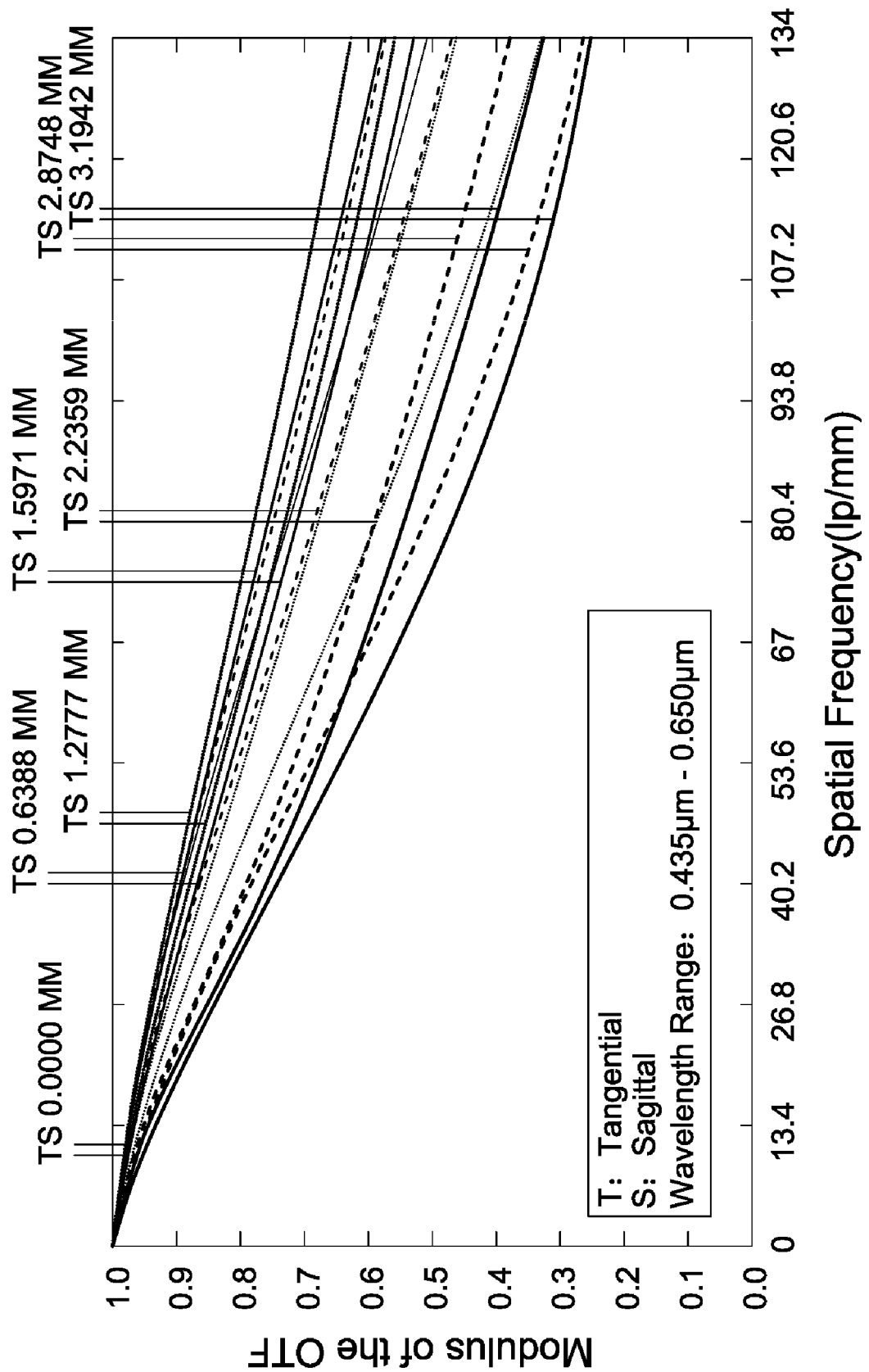
FIG. 8E is a modulation transfer function diagram of the wide-angle lens assembly in accordance with the fourth embodiment of the invention.

By the above arrangements of the lenses and stop ST4, the wide-angle lens assembly 4 of the fourth embodiment can meet the requirements of optical performance as seen in FIGS. 8A-8E, wherein FIG. 8A shows the longitudinal aberration diagram of the wide-angle lens assembly 4 in accordance with the fourth embodiment of the invention, FIG. 8B shows the field curvature diagram of the wide-angle lens assembly 4 in accordance with the fourth embodiment of the invention, FIG. 8C shows the distortion diagram of the wide-angle lens assembly 4 in accordance with the fourth embodiment of the invention, FIG. 8D shows the lateral color diagram of the wide-angle lens assembly 4 in accordance with the fourth embodiment of the invention, and FIG. 8E shows the modulation transfer function diagram of the wide-angle lens assembly 4 in accordance with the fourth embodiment of the invention.

It can be seen from FIG. 8A that the longitudinal aberration in the wide-angle lens assembly 4 of the fourth embodiment ranges from −0.035 mm to 0.055 mm for the wavelength of 0.435 μm, 0.490 μm, 0.550 μm, 0.610 μm and 0.650 μm.

It can be seen from FIG. 8B that the field curvature of tangential direction and sagittal direction in the wide-angle lens assembly 4 of the fourth embodiment ranges from −0.05 mm to 0.02 mm for the wavelength of 0.550 μm.

It can be seen from FIG. 8C that the distortion in the wide-angle lens assembly 4 of the fourth embodiment ranges from −4% to 0.1% for the wavelength of 0.550 μm.

It can be seen from FIG. 8D that the lateral color in the wide-angle lens assembly 4 of the fourth embodiment ranges from −1.25 μm to 4.75 μm for the wavelength of 0.435 μm, 0.490 μm, 0.550 μm, 0.610 μm, and 0.650 μm, and the field ranged from 0 mm to 3.1942 mm.

It can be seen from FIG. 8E that the modulation transfer function of tangential direction and sagittal direction in the wide-angle lens assembly 4 of the fourth embodiment ranges from 0.26 to 1.0 wherein the wavelength ranges from 0.435 μm to 0.650 μm, the fields respectively are 0.0000 mm, 0.6388 mm, 1.2777 mm, 1.5971 mm, 2.2359 mm, 2.8748 mm, and 3.1942 mm, and the spatial frequency ranges from 0 lp/mm to 134 lp/mm.

It is obvious that the longitudinal aberration, the field curvature, the distortion, and the lateral color of the wide-angle lens assembly 4 of the fourth embodiment can be corrected effectively, and the resolution of the wide-angle lens assembly 4 of the fourth embodiment can meet the requirement. Therefore, the wide-angle lens assembly 4 of the fourth embodiment is capable of good optical performance.

Referring to Table 13 and Table 14, Table 13 provides optical specifications in accordance with a fifth embodiment of the invention; Table 14 provides aspheric coefficients of each surface in Table 13.

The figure which depicts the lens layout diagram of the wide-angle lens assembly in accordance with the fifth embodiment of the invention is similar to the figure which depicts the lens layout diagram of the wide-angle lens assembly in accordance with the fourth embodiment of the invention, thus the figure which depicts the lens layout diagram of the wide-angle lens assembly in accordance with the fifth embodiment of the invention is omitted.

Table 13 shows that the effective focal length is equal to 3.099 mm, F-number is equal to 1.85, total lens length is equal to 23.5 mm, and field of view is equal to 93.5 degrees for the wide-angle lens assembly of the fifth embodiment of the invention.

TABLE 13

Effective Focal Length = 3.099 mm F-number = 1.85
Total Lens Length = 23.5 mm Field of View = 93.5 Degrees

| Surface Number | Radius of Curvature (mm) | Thickness (mm) | Nd | Vd | Remark |
|---|---|---|---|---|---|
| S51 | 14.275 | 0.5 | 1.806 | 40.93 | The First Lens L51 |
| S52 | 4.295 | 0.975 | | | |
| S53 | 6.53 | 1.543 | 1.651 | 21.51 | The Second Lens L52 |
| S54 | 2.685 | 2.73 | | | |
| S55 | 13.808 | 4.2 | 1.801 | 34.97 | The Third Lens L53 |
| S56 | −7.052 | 0.781 | | | |
| S57 | ∞ | 3.772 | | | Stop ST5 |
| S58 | 8.723 | 1.885 | 1.535 | 56.12 | The Fourth Lens L54 |
| S59 | −4.376 | 0.05 | | | |
| S510 | −5.417 | 0.75 | 1.651 | 21.51 | The Fifth Lens L55 |
| S511 | 7.278 | 0.05 | | | |
| S512 | 5.946 | 1.984 | 1.535 | 56.12 | The Sixth Lens L56 |
| S513 | −6.308 | 3.57 | | | |
| S514 | ∞ | 0.71 | 1.517 | 64.17 | Optical Filter OF5 |
| S515 | ∞ | 0 | | | |

The aspheric surface sag z of each lens in table 13 can be calculated by the following formula:

$$z = ch^2 / \{1 + [1-(k+1)c^2h^2]^{1/2}\} + Ah^4 \pm Bh^6 + Ch^8 + Dh^{10}$$

where c is curvature, h is the vertical distance from the lens surface to the optical axis, k is conic constant and A, B, C and D are aspheric coefficients.

In the fifth embodiment, the conic constant k and the aspheric coefficients A, B, C, D of each surface are shown in Table 14.

TABLE 14

| Surface Number | k | A | B | C | D |
|---|---|---|---|---|---|
| S53 | −3.952082 | 0.006436711 | −0.000409 | 1.66E−05 | −5.35E−07 |
| S54 | −0.670741 | 0.0088735 | −0.000772 | −1.05E−05 | −1.05E−07 |
| S58 | 0 | −1.54E−05 | 0.0004286 | −0.000136 | 0 |
| S59 | −2.772091 | −0.003227 | −0.000344 | 3.05E−05 | 0 |
| S510 | 0.636053 | −0.002407 | −0.000185 | 0.0001215 | 0 |
| S511 | −2.163589 | 0.0013969 | 8.48E−05 | −9.67E−07 | 0 |
| S512 | 1.912412 | 0.0006602 | −0.000208 | 0 | 0 |
| S513 | −1.357917 | 0.0015171 | 0.0001289 | 1.03E−05 | 0 |

The above longitudinal aberration (figure is omitted), field curvature (figure is omitted), distortion (figure is omitted), and lateral color (figure is omitted) for the fifth embodiment of the wide-angle lens assembly can be corrected effectively, and the resolution for the fifth embodiment of the wide-angle lens assembly can meet the requirement. Therefore, the wide-angle lens assembly of the fifth embodiment is capable of good optical performance.

Referring to Table 15 and Table 16, Table 15 provides optical specifications in accordance with a sixth embodiment of the invention; Table 16 provides aspheric coefficients of each surface in Table 15.

The figure which depicts the lens layout diagram of the wide-angle lens assembly in accordance with the sixth embodiment of the invention is similar to the figure which depicts the lens layout diagram of the wide-angle lens assembly in accordance with the fourth embodiment of the invention, thus the figure which depicts the lens layout diagram of the wide-angle lens assembly in accordance with the sixth embodiment of the invention is omitted.

Table 15 shows that the effective focal length is equal to 3.369 mm, F-number is equal to 1.8, total lens length is equal to 24.025 mm, and field of view is equal to 90.0 degrees for the wide-angle lens assembly of the sixth embodiment of the invention.

TABLE 15

Effective Focal Length = 3.369 mm F-number = 1.8
Total Lens Length = 24.025 mm Field of View = 90.0 Degrees

| Surface Number | Radius of Curvature (mm) | Thickness (mm) | Nd | Vd | Remark |
|---|---|---|---|---|---|
| S61 | 12.051 | 2.327 | 1.883 | 40.81 | The First Lens L61 |
| S62 | 3.955 | 0.508 | | | |
| S63 | 8.339 | 0.811 | 1.643 | 22.44 | The Second Lens L62 |
| S64 | 3.453 | 4.141 | | | |
| S65 | 12.287 | 3.726 | 1.801 | 34.97 | The Third Lens L63 |
| S66 | −7.249 | 2.027 | | | |
| S67 | ∞ | 0.090 | | | Stop ST6 |
| S68 | −50 | 2.757 | 1.531 | 55.84 | The Fourth Lens L64 |
| S69 | −4.089 | 0.050 | | | |
| S610 | −5.009 | 0.250 | 1.651 | 21.51 | The Fifth Lens L65 |
| S611 | 7.632 | 0.020 | | | |
| S612 | 7.176 | 1.737 | 1.531 | 55.84 | The Sixth Lens L66 |
| S613 | −4.264 | 4.872 | | | |
| S614 | ∞ | 0.71 | 1.517 | 64.17 | Optical Filter OF6 |
| S615 | ∞ | 0 | | | |

The aspheric surface sag z of each lens in table 15 can be calculated by the following formula:

$$z = ch^2 / \{1 + [1-(k+1)c^2h^2]^{1/2}\} + Ah^4 \pm Bh^6 + Ch^8 + Dh^{10}$$

where c is curvature, h is the vertical distance from the lens surface to the optical axis, k is conic constant and A, B, C and D are aspheric coefficients.

In the sixth embodiment, the conic constant k and the aspheric coefficients A, B, C, D of each surface are shown in Table 16.

TABLE 16

| Surface Number | k | A | B | C | D |
|---|---|---|---|---|---|
| S63 | 3.923508 | 8.53E−03 | −0.000702738 | 4.13E−05 | −1.83E−06 |
| S64 | −0.301564 | 1.21E−02 | −0.000552 | 4.21E−05 | −4.46E−06 |
| S68 | 0 | −0.003344 | −0.000232 | −3.71E−05 | −0.003344 |
| S69 | −0.807803 | −0.003224 | 9.17E−05 | 3.79E−05 | −0.003224 |
| S610 | 1.317336 | 0.0003329 | 1.63E−05 | 0.0001111 | 0 |
| S611 | 2.229362 | 0.0021145 | −0.000334 | 1.82E−05 | 0 |
| S612 | 1.010015 | 0.0014163 | −7.59E−05 | 0 | 0 |
| S613 | −0.499054 | 0.0007902 | −2.03E−05 | 2.65E−05 | 0 |

The difference between the above sixth embodiment of the wide-angle lens assembly, the fourth embodiment of the wide-angle lens assembly, and the fifth embodiment of the wide-angle lens assembly is that the object side surface S68 of the fourth lens L64 is a concave surface for the sixth embodiment of the wide-angle lens assembly, however, the object side surface S48 of the fourth lens L44 is a convex surface for the fourth embodiment of the wide-angle lens assembly and the object side surface S58 of the fourth lens L54 is a convex surface for the fifth embodiment of the wide-angle lens assembly.

The above longitudinal aberration (figure is omitted), field curvature (figure is omitted), distortion (figure is omitted), and lateral color (figure is omitted) for the sixth embodiment of the wide-angle lens assembly can be corrected effectively, and the resolution for the sixth embodiment of the wide-angle lens assembly can meet the requirement. Therefore, the wide-angle lens assembly of the sixth embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wide-angle lens assembly comprising:
   a first lens which is with refractive power;
   a second lens which comprises a convex surface facing an object side;
   a third lens which is with positive refractive power and comprises a convex surface facing an image side;
   a fourth lens which is with refractive power;
   a fifth lens which comprises a concave surface facing the object side; and
   a sixth lens which comprises a concave surface facing the image side;
   wherein the first lens, the second lens, the third lens, the fourth lens, the fifth lens, and the sixth lens are arranged in order from the object side to the image side along an optical axis;
   wherein the wide-angle lens assembly satisfies:

$0.61 < (R_{41}R_{42})/(R_{41}+R_{42}) < 5.60$, wherein $R_{41}$ is a radius of curvature of an object side surface of the fourth lens and $R_{42}$ is a radius of curvature of an image side surface of the fourth lens.

2. The wide-angle lens assembly as claimed in claim 1, wherein the second lens further comprises a concave surface facing the image side, the third lens further comprises a convex surface facing the object side, and the fourth lens comprises a convex surface facing the object side.

3. The wide-angle lens assembly as claimed in claim 2, further comprising a stop disposed between the second lens and the third lens.

4. The wide-angle lens assembly as claimed in claim 3, wherein the wide-angle lens assembly satisfies:

$0.5 < SL/TTL < 0.8$, wherein SL is an interval from the stop to an image plane along the optical axis and TTL is an interval from an object side surface of the first lens to the image plane along the optical axis.

5. The wide-angle lens assembly as claimed in claim 2, wherein the wide-angle lens assembly satisfies:

$0.6 < (Vd_1+Vd_2)/Vd_6 < 5.5$, wherein $Vd_1$ is an Abbe number of the first lens, $Vd_2$ is an Abbe number of the second lens, and $Vd_6$ is an Abbe number of the sixth lens.

6. The wide-angle lens assembly as claimed in claim 2, wherein:
   the first lens comprises two surfaces, at least one of which is an aspheric surface or both of which are aspheric surfaces;
   the convex surface of the second lens is an aspheric surface, or the concave surface of the second lens is an aspheric surface, or both of the convex surface and the concave surface of the second lens are aspheric surfaces;
   at least one of the two convex surfaces of the third lens is an aspheric surface or both of the two convex surfaces of the third lens are aspheric surfaces;
   the fourth lens further comprises a surface, wherein the surface is an aspheric surface, or the convex surface of the fourth lens is an aspheric surface, or both of the surface and the convex surface of the fourth lens are aspheric surfaces;
   the fifth lens further comprises a surface, wherein the surface is an aspheric surface, or the concave surface of the fifth lens is an aspheric surface, or both of the surface and the concave surface of the fifth lens are aspheric surfaces; and
   the sixth lens further comprises a surface, wherein the surface is an aspheric surface, or the concave surface of the sixth lens is an aspheric surface, or both of the surface and the concave surface of the sixth lens are aspheric surfaces.

7. The wide-angle lens assembly as claimed in claim 2, wherein the first lens, the second lens, the third lens, the fourth lens, the fifth lens, and the sixth lens are made of plastic material.

8. The wide-angle lens assembly as claimed in claim 1, wherein the wide-angle lens assembly satisfies:

$1.54 \leq |f_6/f| \leq 13.37$, wherein $f_6$ is an effective focal length of the sixth lens and f is an effective focal length of the wide-angle lens assembly.

9. The wide-angle lens assembly as claimed in claim 1, wherein the wide-angle lens assembly satisfies:

$$1.00 \leq (Nd_1 \times Vd_1)/(Nd_3 \times Vd_3) < 1.29,$$

wherein $Nd_1$ is an index of refraction of the first lens, $Nd_3$ is an index of refraction of the third lens, $Vd_1$ is an Abbe number of the first lens, and $Vd_3$ is an Abbe number of the third lens.

10. The wide-angle lens assembly as claimed in claim 1, wherein the wide-angle lens assembly satisfies:

$$0 \leq |Vd_1 - Vd_2| < 36,$$

wherein $Vd_1$ is an Abbe number of the first lens and $Vd_2$ is an Abbe number of the second lens.

11. A wide-angle lens assembly comprising:
a first lens which is with refractive power;
a second lens which is with negative refractive power;
a third lens which is with positive refractive power and comprises a convex surface facing an image side;
a stop;
a fourth lens which is with refractive power;
a fifth lens which is with refractive power and comprises a concave surface facing an object side; and
a sixth lens which is with positive refractive;
wherein the first lens, the second lens, the third lens, the stop, the fourth lens, the fifth lens, and the sixth lens are arranged in order from the object side to the image side along an optical axis.

12. The wide-angle lens assembly as claimed in claim 11, wherein the first lens is with negative refractive power, the fourth lens is with positive refractive power, and the fifth lens is with negative refractive power.

13. The wide-angle lens assembly as claimed in claim 12, wherein the first lens comprises a convex surface facing the object side, the second lens comprises a concave surface facing the image side, the third lens further comprises a convex surface facing the object side, the fourth lens comprises a convex surface facing the image side, the fifth lens further comprises a concave surface facing the image side, and the sixth lens comprises a convex surface facing the image side.

14. The wide-angle lens assembly as claimed in claim 13, wherein the wide-angle lens assembly satisfies:

$$0.61 < (R_{41} - R_{42})/(R_{41} + R_{42}) < 5.60,$$

wherein $R_{41}$ is a radius of curvature of an object side surface of the fourth lens and $R_{42}$ is a radius of curvature of the convex surface of the fourth lens.

15. The wide-angle lens assembly as claimed in claim 13, wherein the wide-angle lens assembly satisfies:

$$0 \leq |Vd_1 - Vd_2| < 36,$$

wherein $Vd_1$ is an Abbe number of the first lens and $Vd_2$ is an Abbe number of the second lens.

16. The wide-angle lens assembly as claimed in claim 12, wherein the wide-angle lens assembly satisfies:

$$0.6 < (Vd_1 + Vd_2)/Vd_6 < 5.5,$$

wherein $Vd_1$ is an Abbe number of the first lens, $Vd_2$ is an Abbe number of the second lens, and $Vd_6$ is an Abbe number of the sixth lens.

17. The wide-angle lens assembly as claimed in claim 11, wherein the second lens comprises a concave surface facing the image side.

18. The wide-angle lens assembly as claimed in claim 11, wherein the wide-angle lens assembly satisfies:

$$0.65 < |f_{456}/f_{123}| < 1.95,$$

wherein $f_{123}$ is an effective focal length of a combination of the first lens, the second lens, and the third lens and $f_{456}$ is an effective focal length of a combination of the fourth lens, the fifth lens, and the sixth lens.

19. The wide-angle lens assembly as claimed in claim 11, wherein the wide-angle lens assembly satisfies:

$$4.4 < TTL/EPP < 6.2,$$

wherein TTL is an interval from an object side surface of the first lens to an image plane along the optical axis and EPP is an entrance pupil position.

20. A wide-angle lens assembly comprising:
a first lens which is with refractive power;
a second lens which is with negative refractive power;
a third lens which is with positive refractive power and comprises a convex surface facing an image side;
a stop;
a fourth lens which is with refractive power;
a fifth lens which is with refractive power and comprises a concave surface facing an object side; and
a sixth lens which is with positive refractive;
wherein the first lens, the second lens, the third lens, the stop, the fourth lens, the fifth lens, and the sixth lens are arranged in order from the object side to the image side along an optical axis; wherein the wide-angle lens assembly satisfies:

$$0.4 < SL/TTL < 0.8,$$

wherein SL is an interval from the stop to an image plane along the optical axis and TTL is an interval from an object side surface of the first lens to the image plane along the optical axis.

* * * * *